US012624283B2

(12) United States Patent
Fischer et al.

(10) Patent No.: US 12,624,283 B2
(45) Date of Patent: May 12, 2026

(54) BLUE TO UV UP-CONVERTER COMPRISING LANTHANIDE IONS SUCH AS PR3+ ACTIVATED AND OPTIONALLY GD3+ CO-ACTIVATED SILICATES AND ITS APPLICATION FOR SURFACE DISINFECTION PURPOSES

(71) Applicant: Evonik Operations GmbH, Essen (DE)

(72) Inventors: Stefan Fischer, Soest (DE); David Böhnisch, Kirchheim am Neckar (DE); Thomas Jüstel, Witten (DE); Simone Schulte, Essen (DE); Markus Hallack, Schermbeck (DE)

(73) Assignee: Evonik Operations GmbH, Essen (DE)

( * ) Notice: Subject to any disclaimer, the term of this patent is extended or adjusted under 35 U.S.C. 154(b) by 1066 days.

(21) Appl. No.: 17/754,783

(22) PCT Filed: Oct. 5, 2020

(86) PCT No.: PCT/EP2020/077798
§ 371 (c)(1),
(2) Date: Apr. 12, 2022

(87) PCT Pub. No.: WO2021/073915
PCT Pub. Date: Apr. 22, 2021

(65) Prior Publication Data
US 2022/0403239 A1 Dec. 22, 2022

(30) Foreign Application Priority Data
Oct. 14, 2019 (EP) ..................................... 19202910

(51) Int. Cl.
*C09K 11/77* (2006.01)
*C09K 11/02* (2006.01)

(52) U.S. Cl.
CPC .. *C09K 11/77742* (2021.01); *C09K 11/77062* (2021.01)

(58) Field of Classification Search
CPC ........ C09K 11/77742; C09K 11/77062; C09K 11/7766; C09K 11/717; C09K 11/77212; C09K 11/758; C09K 11/02; C09K 11/025; A61L 2/08
See application file for complete search history.

(56) References Cited

U.S. PATENT DOCUMENTS

| | | | |
|---|---|---|---|
| 4,963,787 | A | 10/1990 | Verlijsdonk et al. |
| 6,794,445 | B2 | 9/2004 | Reusmann et al. |
| 7,535,009 | B2 | 5/2009 | Juestel et al. |
| 7,902,564 | B2 | 3/2011 | Mueller-Mach et al. |
| 8,617,422 | B2 | 12/2013 | Koschan et al. |
| 9,266,825 | B2 | 2/2016 | Lomoelder et al. |
| 9,796,876 | B2 | 10/2017 | Lomoelder et al. |
| 9,902,095 | B2 | 2/2018 | Stapperfenne et al. |
| 9,902,096 | B2 | 2/2018 | Stapperfenne et al. |
| 10,100,207 | B2 | 10/2018 | Stache et al. |
| 10,239,898 | B2 | 3/2019 | Hallack et al. |
| 10,626,291 | B2 | 4/2020 | Hallack et al. |
| 10,633,555 | B2 | 4/2020 | Stache et al. |
| 11,021,608 | B2 | 6/2021 | Seyfried et al. |
| 11,254,819 | B2 | 2/2022 | Hallack et al. |
| 11,713,400 | B2 * | 8/2023 | Schulte .................. A01N 59/06 |
| | | | 427/407.1 |
| 2003/0198819 | A1 | 10/2003 | Reusmann et al. |
| 2006/0022146 | A1 | 2/2006 | Juestel et al. |
| 2006/0108910 | A1 * | 5/2006 | Justel ................. C09K 11/7764 |
| | | | 252/301.4 F |
| 2007/0203307 | A1 | 8/2007 | Cavaleiro et al. |
| 2010/0297206 | A1 | 11/2010 | Kim et al. |

(Continued)

FOREIGN PATENT DOCUMENTS

| | | |
|---|---|---|
| CN | 103421504 | 12/2013 |
| JP | H02-247279 | 10/1990 |
| JP | 2005-536736 | 12/2005 |
| JP | 2005-536843 | 12/2005 |
| JP | 2010-270117 | 12/2010 |
| JP | 2014-500890 | 1/2014 |
| JP | 2016-121326 | 7/2016 |
| WO | 2014/135353 | 9/2014 |

OTHER PUBLICATIONS

International Search Report mailed Jan. 19, 2021 in PCT/EP2020/077798, 4 pages.

(Continued)

*Primary Examiner* — Matthew E. Hoban
*Assistant Examiner* — Lynne Edmondson
(74) *Attorney, Agent, or Firm* — Grüneberg Global IP, PLLC

(57) ABSTRACT

A silicate-based lanthanide ion doped material converts electromagnetic radiation energy of a longer wavelength of below 530 nm to electromagnetic radiation energy of shorter wavelengths in the range of 220 to 425 nm. The silicate-based material is a crystalline silicate material doped with lanthanide ions selected from praseodymium, gadolinium, erbium, and neodymium. For co-doping, at least two of the lanthanide ions are used. The silicate-based material is obtainable from a blend comprising salts and an organic solvent, followed by specific calcination processes and tribological impacts to adjust particle size and to increase the crystallinity of the particles. The silicate-based material can be used to inactivate microorganisms or cells covering a surface containing the silicate-based material under exposure of electromagnetic radiation energy of a longer wavelength of below 500 nm.

10 Claims, 20 Drawing Sheets

(56)　　　References Cited

U.S. PATENT DOCUMENTS

| | | | |
|---|---|---|---|
| 2013/0052079 A1 | 2/2013 | Bernstein | |
| 2013/0207002 A1 | 8/2013 | Greuel et al. | |
| 2013/0224071 A1* | 8/2013 | Bernstein | C09K 11/7769 |
| | | | 424/617 |
| 2015/0191625 A1 | 7/2015 | Lomoelder et al. | |
| 2015/0225337 A1 | 8/2015 | Lomoelder et al. | |
| 2015/0321392 A1 | 11/2015 | Stapperfenne et al. | |
| 2015/0321393 A1 | 11/2015 | Stapperfenne et al. | |
| 2016/0017165 A1 | 1/2016 | Numrich et al. | |
| 2016/0108280 A1 | 4/2016 | Hallack et al. | |
| 2016/0297974 A1 | 10/2016 | Stache et al. | |
| 2017/0298250 A1 | 10/2017 | Anselmann et al. | |
| 2018/0179234 A1 | 6/2018 | Hallack et al. | |
| 2019/0048224 A1 | 2/2019 | Stache et al. | |
| 2019/0241741 A1 | 8/2019 | Seyfried et al. | |
| 2020/0308406 A1 | 10/2020 | Seyfried et al. | |
| 2021/0122921 A1 | 4/2021 | Hallack et al. | |
| 2021/0253889 A1 | 8/2021 | Schulte et al. | |
| 2021/0403753 A1 | 12/2021 | Schulte et al. | |
| 2022/0041887 A1 | 2/2022 | Roland et al. | |
| 2022/0049362 A1 | 2/2022 | Hallack et al. | |

OTHER PUBLICATIONS

Written Opinion mailed Jan. 19, 2021 in PCT/EP2020/077798, 7 pages.

Naumann et al., U.S. Appl. No. 18/554,976, filed Oct. 11, 2023.

Naumann et al., U.S. Appl. No. 18/555,015, filed Oct. 12, 2023.

U.S. Appl. No. 18/554,976, filed Oct. 11, 2023, Naumann et al.

U.S. Appl. No. 18/555,015, filed Oct. 12, 2023, Naumann et al.

Extended European Search Report dated May 19, 2020, in European Patent Application No. 19202910.6, 8 pages.

Madsen et al., "Description and survey of methodologies for the determination of amorphous content via X-ray powder diffraction", Z. Kristallogr., vol. 226, 2011, pp. 944-955.

Madsen et al., "Quantifying Amorphous Phases", Bruker, document presented at PPXRD-Pharmaceutical Powder X ray Diffraction Symposium, 55 pages.

Pecharsky et al., "The Powder Diffraction Pattern", Fundamentals of Powder Diffraction and Structural Characterization of Materials, Chapter 8, pp. 151-202.

U.S. Pat. No. 6,794,445, Sep. 21, 2004, 2003/0198819, Reusmann et al.

U.S. Appl. No. 11/677,821, filed Feb. 22, 2007, 2007/0203307, Cavaleiro et al.

U.S. Pat. No. 9,796,876, filed Oct. 24, 2017, 2015/0191625, Lomoelder et al.

U.S. Pat. No. 10,626,291, Apr. 21, 2020, 2016/0108280, Hallack et al.

U.S. Appl. No. 14/772,019, filed Sep. 1, 2015, 2016/0017165, Numrich et al.

U.S. Pat. No. 9,266,825, Feb. 23, 2016, 2015/0225337, Lomoelder et al.

U.S. Pat. No. 10,239,898, Mar. 26, 2019, 2018/0179234, Hallack et al.

U.S. Pat. No. 9,902,095, Feb. 27, 2018, 2015/0321392, Stapperfenne et al.

U.S. Pat. No. 9,902,096, Feb. 27, 2018, 2015/0321393, Stapperfenne et al.

U.S. Appl. No. 15/510,282, filed Mar. 10, 2017, 2017/0298250, Anselmann et al.

U.S. Pat. No. 10,100,207, Oct. 16, 2018, 2016/0297974, Stache et al.

U.S. Pat. No. 10,633,555, Apr. 28, 2020, 2019/0048224, Stache et al.

U.S. Pat. No. 11,021,608, Jun. 1, 2021, 2019/0241741, Seyfried et al.

U.S. Appl. No. 16/834,781, filed Mar. 30, 2020, 2020/0308406, Seyfried et al.

U.S. Appl. No. 17/176,922, filed Feb. 16, 2021, 2021/0253889, Schulte et al.

U.S. Appl. No. 17/754,777, filed Apr. 12, 2022, Fischer et al.

U.S. Pat. No. 11,254,819, Feb. 22, 2022, 2021/0122921, Hallack et al.

U.S. Appl. No. 17/395,616, filed Aug. 6, 2021, 2022/0041887, Roland et al.

U.S. Appl. No. 17/355,385, filed Jun. 23, 2021, 2021/0403753, Schulte et al.

U.S. Appl. No. 17/399,171, filed Aug. 11, 2021, 2022/0049362, Hallack et al.

* cited by examiner

BLUE TO UV UP-CONVERTER COMPRISING LANTHANIDE IONS SUCH AS PR3+ ACTIVATED AND OPTIONALLY GD3+ CO-ACTIVATED SILICATES AND ITS APPLICATION FOR SURFACE DISINFECTION PURPOSES

CROSS-REFERENCE TO RELATED APPLICATIONS

This application is the National Stage entry under § 371 of International Application No. PCT/EP2020/077798, filed on Oct. 5, 2020, and which claims the benefit of priority to European Application No. 19202910.6, filed on Oct. 14, 2019. The content of each of these applications is hereby incorporated by reference in its entirety.

BACKGROUND OF THE INVENTION

Field of the Invention

A silicate-based lanthanide ion doped material for converting electromagnetic radiation energy of a longer wavelength of below 530 nm to electromagnetic radiation energy of shorter wavelengths in the range of 220 to 425 nm, wherein the silicate-based material is a crystalline silicate material doped with lanthanide ions selected from praseodymium, gadolinium, erbium, neodymium and for co-doping at least two of them. Further the silicate-based material is obtainable, in a particular, from a blend comprising salts and an organic solvent followed by specific calcination processes and tribological impacts to adjust particle sizes and increase the crystallinity of the particles. The silicate-based material can be used to inactivate microorganisms or cells under exposure of electromagnetic radiation energy of a longer wavelength of below 500 nm.

DESCRIPTION OF RELATED ART

Since the invention of efficiently blue or UV-A emitting (In,Ga)N semiconductor materials (365-500 nm), inorganic solid state light sources have outperformed other lighting technologies such as incandescent and discharge lamps and thus indoor and, in the meantime also outdoor lighting is dominated by phosphor converted light emitting diodes (pcLEDs) utilizing the inorganic semiconductor material (In,Ga)N as the primary radiation source.

It is expected that this situation will settle for the next decades and that light sources relying on blue emitting (In,Ga)N LEDs as primary radiation source will penetrate into and dominate all kind of lighting application areas, e.g. indoor, outdoor, advertisement, architecture, decoration, special, and street lighting.

Therefore, indoor illumination will rely on semiconductor light sources, with an emission band between 400 and 480 nm, which will partly be converted by inorganic phosphors into other colours to obtain white light. However, depending on the colour temperature aimed at about 5 to 10% of the overall power distribution will remain in the blue spectral range, which in turn means that this radiation can enforce the excitation of an illuminated up-converter to obtain UV radiation at the point of illumination.

Recently, this opportunity caused dedicated R&D projects in aiming at the identification of efficient blue to UV-C up-conversion materials, such as $Y_2SiO_5$:Pr,Gd,Li and some other. The main problem of materials discovered and published so far is their rather low up-conversion efficiency, which is just above the detection level or signal to noise ratio.

Further, US 2013/0052079 discloses a composition comprising phosphors capable of converting an initial electromagnetic energy (A) to an electromagnetic energy (B) in order to deactivate or kill microorganism. However, the method as described therein does not lead to a phosphor with up-conversion property.

What is really wanted is an up-converting material, which enables the significant reduction of infectious microorganisms within a period typical for daylight illumination, i.e. within a few hours, so that a daily reduction of microorganisms can be effectively achieved. Moreover, the material must be non-hazardous to the environment and should show an operational lifetime of at least 10000 hours. Finally, the material must be cost-effective and recyclable to achieve a wide penetration into such surface coatings.

Further, the efficiency of the up-conversion material must therefore be much better than of the known materials as only the remaining 5 to 10% of the overall power distribution in the LED remain in the blue spectral range and shall be used to enforce the excitation of an illuminated up-converter to obtain UV radiation at the point of illumination.

SUMAMRY OF THE INVENTION

Subject of the current invention is therefore to furnish a blue/green to UV radiation up-converting inorganic material with an increased efficiency as well as a process for the production of that material.

The subject is solved by the disclosed novel blue/green to UV radiation up-converting inorganic silicate-based materials, the process to produce them and their application in coatings, surfaces of matrix materials, thin film, composite layers. Particularly preferred embodiments are disclosed in the description. One preferred embodiment of the invention concerns $Pr^{3+}$ activated and $Gd^{3+}$ co-doped silicates, according to the idealised general formula $A_{1-x-y-z}B^*{}_yB_2SiO_4$:$Pr_x$ and optional $Gd_z$, in particular $A_{1-x-y-z}B^*{}_yB_2SiO_4$:$Pr_x$ and optional $Gd_z$, with A=Mg, Ca, Sr, Ba; and B=Li, Na, K, Rb, Cs, preferred are Li, Na, K, particular preferred Li; and B*=Li, Na, K, Rb, Cs, preferred are Na, K. Wherein in both formula x=0.0001 to 0.05, preferred 0.001 to 0.05, z=0 or z=0.0001 to 0.3, preferred 0.001 to 0.3, and y=x+z, wherein y may be y=0.0001 to 0.35, preferred are i) y=x if z=o, and ii) y=0.0002 to 0.35 if z=0.001 to 0.3, B*y acts as charge compensation of $Pr_x$ and $Gd_z$. Preferred examples are $Ca_{0.98}Pr_{0.01}$ $Na_{0.01}Li_2SiO_4$ or $Ca_{0.96}Pr_{0.01}Gd_{0.01}$ $Na_{0.02}Li_2SiO_4$.

DETAILED DESCRIPTION OF THE INVENTION

Alternatively, an idealised general formula can be $A_{1-2x-2z}B^*_{x+z}B_2SiO_4$:$Pr_x$, $Gd_z$, wherein x+z in B* is coupled to $Pr_x$ and $Gd_z$.

A further embodiment of the invention relates to the incorporation of such a Vis and/or UV radiation up-converter material into polymer matrix.

The silica-based materials according to the invention doped with lanthanide ions are capable to reduce the concentration of microorganisms at the surface upon solar light or LED lamp illumination.

Figure 26:
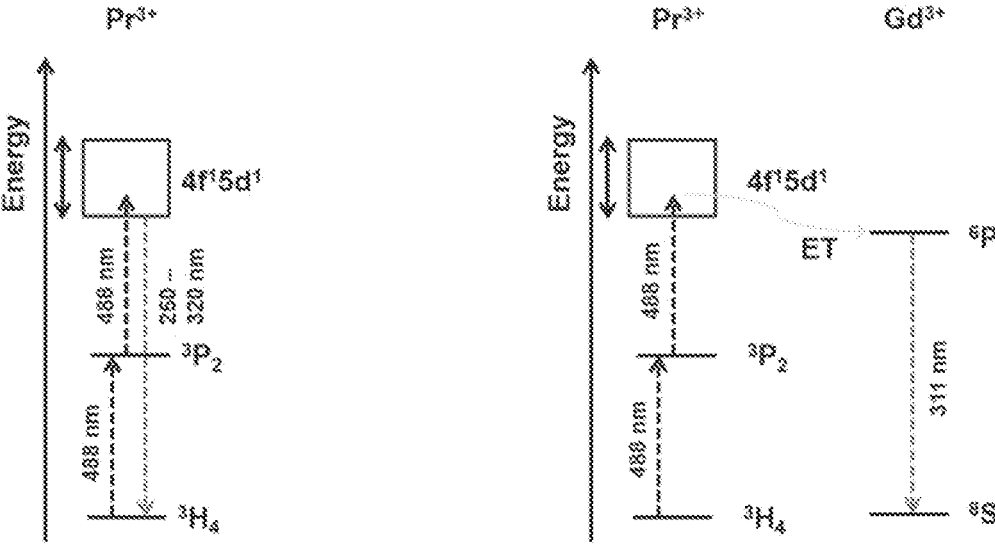
FIG. 26 shows a simplified energy level scheme of $Pr^{3+}$ (ground state configuration [Xe]$4f^2$) and $Gd^{3+}$ (ground state configuration [Xe]$4f^7$) showing the relevant optical transitions and energy transfer processes involved in the up-conversion mechanism resulting in UV emission.

Subject of the invention is to provide an UV emitting material, in particular a material that is able to emit electromagnetic radiation energy at a wavelength in the range of 220 to 425 nm, in particular of 240 nm to 320 nm, most preferred in the range of 250 to 320 nm. Praseodymium and gadolinium co-doped silicates possess a very intensive emission at 311 nm (FIG. 26). A further subject of the invention is to provide a composition or a film comprising at least one type of photoluminescent inorganic microscale particles, in compositions or film for self-disinfection purposes. These particles are able to convert blue to green (380-550 nm) photons into UV photons, a process which is known as up-conversion. In particular the particles possess a crystallinity of the material that is greater than 70%, in particular equal of greater than 80%, 90%, more preferred equal or greater than 95%, 98%, most preferred equal to greater than 99%. The crystallinity may be evaluated by a method known to the skilled person (crystallographer) using Rietveld analysis (Madsen et al., Description and survey of methodologies for the determination of amorphous content via X-ray powder diffraction, Z. Kristallogr. 226 (2011) 944-955).

According to a main aspect of the invention the UV emitting material, the silicate-based lanthanide ion doped material, in particular the material that is able to emit electromagnetic radiation energy at a wavelength (shorter wavelength) in the range of 220 to 425 nm, in particular of 240 nm to 320 nm, is not harmful to microorganisms without being irradiated, in particular without being irradiated with a wavelength in the range of 450 nm and longer wavelength, in particular in the range of 450 nm to 530 nm. Irradiation of the UV emitting material, the silicate-based lanthanide ion doped material, with a wavelength in the range of 450 nm and longer wavelength, in particular in the range of 450 nm to 530 nm, induces emission of electromagnetic radiation energy at a wavelength (shorter wavelength) in the range of 220 to 425 nm, in particular of 240 nm to 320 nm, that is harmful to microorganisms.

The invention was realized by the use of a $Pr^{3+}$ doped and optionally $Gd^{3+}$ co-doped host silicate-based material in which blue light (wavelength below 500 nm) is absorbed via transitions from the $^3H_4$ level of the ground state configuration $[Xe]4f^2$ of $Pr^{3+}$ to the $^3P_{0, 1, 2}$ excited states. The photon energy corresponds to photons with a wavelength in the range from 440 to 490 nm.

In a second step, after relaxation into the $^3P_0$ level, excited state absorption causing the population of the excited state configuration $[Xe]4f^1 5d^1$ takes place, by utilizing again the blue pump source. This requires crystal-field components of the excited state configuration $[Xe]4f^1 5d^1$ located in the spectral range of 220 to 250 nm. Suitable luminescent materials must thus exhibit a suitable crystal-field splitting to obtain excited 5d-states in this spectral range, and are described.

After excitation, the lowest crystal-field component of the excited state configuration $[Xe]4f^1 5d^1$ return upon emitting a photon to the ground state, resulting in UV radiation.

Co-doping of the described materials by $Gd^{3+}$ leads to energy transfer between $Pr^{3+}$ and $Gd^{3+}$ and subsequently to main emission at 311 nm.

Presently, pcLEDs are the most efficient white light sources and thus widespread in all kind of general lighting applications. The wall-plug efficiency of best practice cool white pcLEDs is almost 60% and the radiant flux is in the range of a few optical Watts per pcLED. Since up-conversion processes can yield an efficiency of about 25% and indoor illumination requires at least 500 lm/m² or 5 W/m² (for a light source with 100 lm/W), the process is of tremendous interest to use the blue to green part of the emission spectrum for so-called low-dose disinfection of surfaces.

According to the invention up-conversion means the conversion of electromagnetic radiation energy of a longer wavelength, in particular below 500 nm, preferred in the range of from 365 to 500 nm, most preferred in the range of 440 to 490 nm, into electromagnetic radiation energy of a shorter wavelength, in particular in the range of 220 to 425 nm, preferred in the range of 250 to 325 nm.

Subject of the invention is therefore a silicate-based lanthanide ion doped material for converting electromagnetic radiation energy of a longer wavelength to electromagnetic radiation energy of a shorter wavelength, wherein the silicate-based material is a crystalline silicate material doped with lanthanide ions, preferred of lanthanide ions (III+), selected from praseodymium, gadolinium, erbium, neodymium and for co-doping at least two of them, and in particular wherein the electromagnetic radiation energy of at least one longer wavelength of below 530 nm, preferred below 500 nm, e.g. 365 to 500 nm, in particular 440 to 495 nm, most preferred is 440 nm to 490 nm, is converted to electromagnetic radiation energy of at least one shorter wavelength in the range of 220 to 425 nm, in particular of 250 to 350 nm, more preferred of 250 to 320 nm. Particularly, the crystalline silicate material is doped or co-doped with lanthanides ions, wherein the lanthanide ions are selected from lanthanide ions (III+).

According to a most preferred embodiment subject of the invention is a silicate-based lanthanide ion doped material for converting electromagnetic radiation energy of a longer wavelength to electromagnetic radiation energy of a shorter wavelength, wherein the silicate-based material is a crystalline silicate material doped with lanthanide ions (III+) selected from praseodymium(III+), gadolinium(III+), erbium(III+), neodymium(III+) and for co-doping at least two of these ions(III+).

According to a most preferred aspect of the invention the lanthanide ions are selected from praseodymium(III+) ($Pr^{3+}$), gadolinium (III+) ($Gd^{3+}$), erbium (III+) ($Er^{3+}$) and neodymium (III+) ($Nd^{3+}$) and for co-doping at least two of them. In a preferred embodiment the silicate-based lanthanide ion doped material is in particular free from lanthanide ions (IV+) due the calcination under reducing atmosphere.

Therefore, the material according to the invention emits electromagnetic radiation energy of at least one shorter wavelength in the range of 220 to 425 nm, in particular of 250 to 350 nm, more preferred of 250 to 320 nm when irradiated with the electromagnetic radiation energy of at least one longer wavelength of below 530 nm, in particular 440 to 495 nm preferred is 440 nm to 490 nm.

Figure 11:
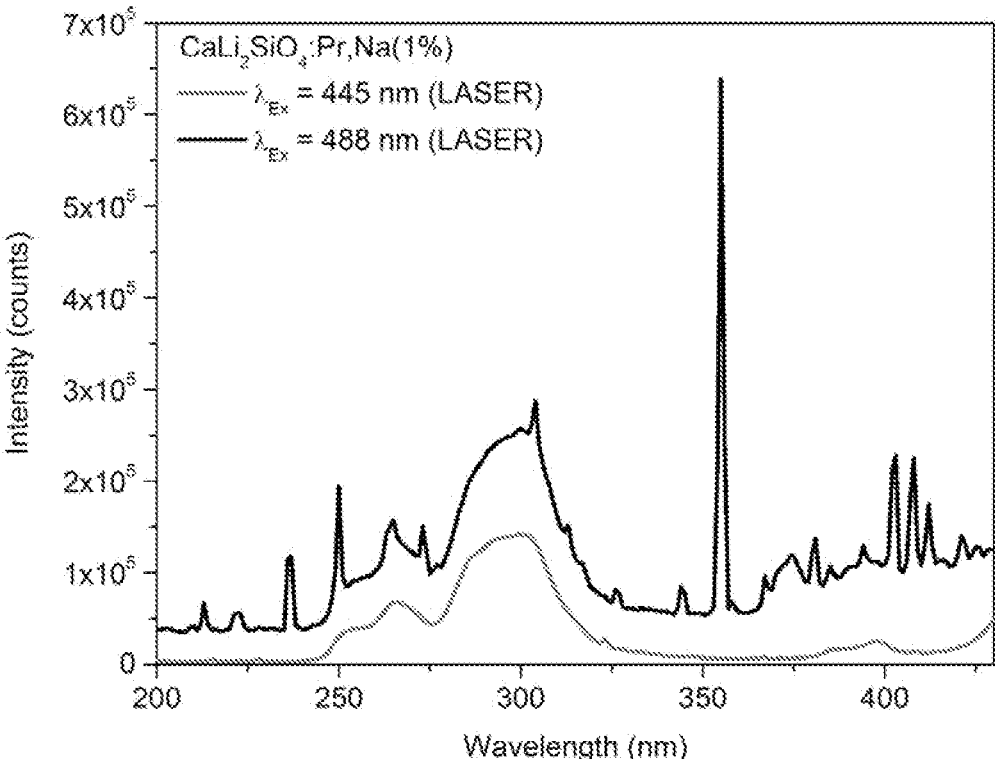
FIG. 11 shows an emission spectrum of $Ca_{0.98}Pr_{0.01}Na_{0.01}Li_2SiO_4$ upon excitation at 445 nm (75 mW) and 488 nm (150 mW) by Lasers (Example 1).
Figure 12:
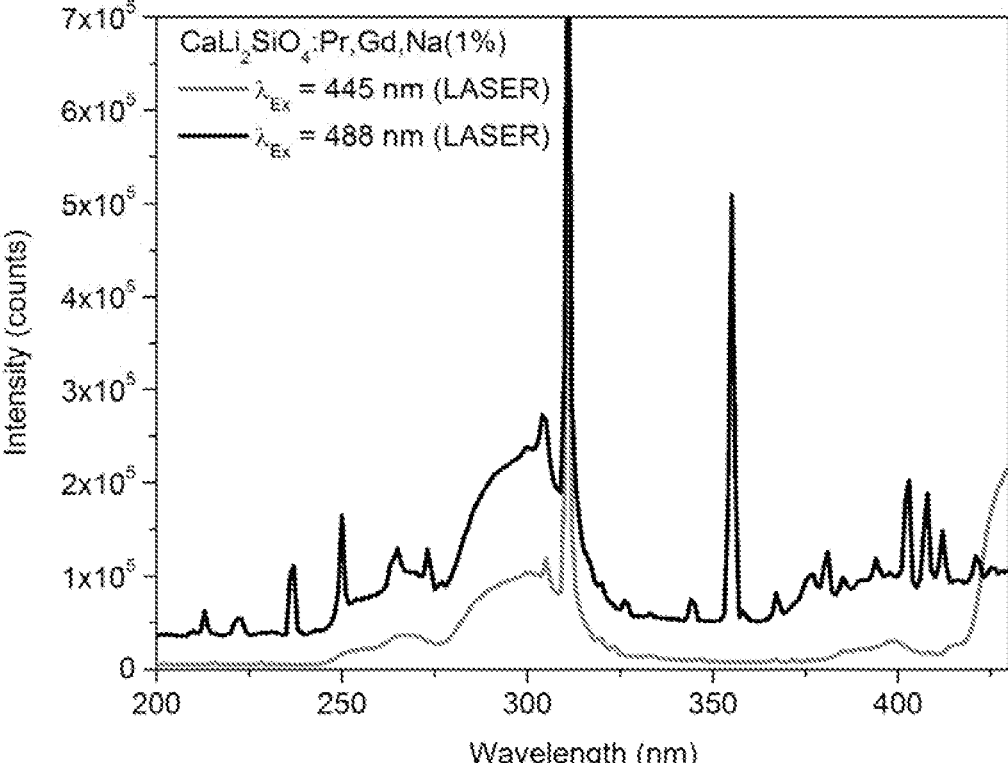
FIG. 12 shows an emission spectrum of $Ca_{0.96}Pr_{0.01}Gd_{0.01}Na_{0.02}Li_2SiO_4$ upon excitation at 445 nm (75 mW) and 488 nm (150 mW) by Lasers (Example 2).

According to FIGS. 11 and 12 the emission spectra of $CaLi_2SiO_4$:Pr,Na (1 mol-%), also referred to as $(Ca_{0.98}Pr_{0.01}Na_{0.01})Li_2SiO_4$ and $CaLi_2SiO_4$:Pr,Gd(1 mol-%),Na(2 mol-%), also referred to as $(Ca_{0.96}Pr_{0.01}Gd_{0.01}Na_{0.02})Li_2SiO_4$ clearly possess emission spectra in the range of 275 to 375 nm with intensities of at least $1×10^5$ counts/(mm²*s) (excitation laser: 445 nm, 75 mW). Excitation with a laser at 488 nm and an efficiency of 150 mW results, see FIGS. 11 and 12, in emission spectra of $CaLi_2SiO_4$:Pr,Na(1 mol-%) also referred to as $(Ca_{0.98}Pr_{0.01}Na_{0.01})Li_2SiO_4$ and $CaLi_2SiO_4$:Pr,Gd(1 mol-%),Na(2 mol-%), also referred to as $(Ca_{0.96}Pr_{0.01}Gd_{0.01}Na_{0.02})Li_2SiO_4$ clearly possessing intensities in the emission spectra in the range of 225 to 425 nm with maxima of the intensities of at least $1×10^5$ counts/(mm²*s), in particular in the sub-range of 230 to 325 nm and optionally in the sub-range of 365 nm to 425 nm. Particular preferred are the maxima of the intensities in the range of 275 nm to 320 nm, in particular with intensities of at least $2×10^5$ counts/(mm²*s), more preferred of $2.5×10^5$ counts/(mm²*s). Excitation with a laser at 488 nm and an efficiency of 150 mW or a laser at 445 nm, 75 mW results, see FIG. 12, in emission spectra of $CaLi_2SiO_4$:Pr,Gd(1 mol-%),Na(2 mol-%), also referred to as $(Ca_{0.96}Pr_{0.01}Gd_{0.01}Na_{0.02})Li_2SiO_4$ clearly possessing an additional intensity in the emission spectra in the range of 300 to 320 nm, in particular at 312 nm, with a maximum of the intensity of at least $5×10^5$ counts/(mm²*s), in particular of at least $6×10^5$ counts/(mm²*s), more preferred of least $7×10^5$ counts/(mm²*s). The intense emission at ca. 312 nm is caused by gadolinium (Gd).

The intensities of the emitted electromagnetic spectra in the range of 220 to 425 nm are at least $5×10^4$ counts/(mm²*s), preferred at least $1×10^5$ counts/(mm²*s), more preferred at least $2×10^5$ counts/(mm²*s). In particular the intensities of the emitted electromagnetic spectra in the range of 220 to 330 nm are at least $2×10^5$ counts/(mm²*s) and the intensities of the emitted electromagnetic spectra in the range of 220 to 425 nm are at least $2 \times 10^5$ counts/ (mm$^2$*s). Wherein the emission spectra is excited with a laser, in particular a laser with an efficiency of 75 mW at 445 nm and/or an efficiency of 150 mW at 488 nm.

Preferred maxima of the converted electromagnetic radiation energy are in the range of 250 to 350 nm, in particular of 270 to 330 nm, most preferred of 280 to 330 nm.

A preferred silicate-based material is doped with praseodymium and co-doped with gadolinium. In particular the crystalline silicate material is doped with praseodymium and co-doped with gadolinium.

According to one aspect of the invention silicate-based materials are preferred, wherein the crystalline silicate material doped with lanthanide ions is selected from cyclosilicates e.g. $[Si_3O_9]^{6-}$, $[Si_4O_{12}]^{-8}$ and/or $[Si_6O_{18}]^{12-}$, pyrosilicates, such as $[Si_2O_7]^{6-}$ and inosilicates, so called chain silicates with an atomic ratio of Si:O 1:3 in single chains and Si:O 4:11 in double chains.

A preferred subject of the invention is a silicate-based lanthanide ion doped material for converting electromagnetic radiation energy of a longer wavelength to electromagnetic radiation energy of a shorter wavelength, wherein the silicate-based material is a crystalline silicate material doped with lanthanide ions (III+) ($Ln^{3+}$), in particular obtainable by heating, preferred by calcination, of the silicate-based lanthanide ions doped material in a reducing atmosphere. In particular by heating above 600° C. and below the melting point, preferred 50° C. to 200° C. below the melting point in a reducing atmosphere. The reducing step after the previous calcination in air is particular relevant to increase the amount of lanthanide ions (III+) and therefore to increase the intensity of up-conversion of the material. According to a most preferred embodiment the crystalline silicate material is doped or co-doped with lanthanides ions, wherein the lanthanide ions are selected from lanthanide ions (III+).

According to one aspect of the invention silicate-based materials are preferred, wherein the crystalline silicate material doped with lanthanide ions is selected from silicates free from crystal water, crystal solvates with —OH functionality. In particular the crystalline silicate material doped with lanthanide ions, preferred $Ln^{3+}$, most preferred above 95% $Ln^{3+}$ and less than 5% $Ln^{4+}$, are selected from silicates that are free from stoichiometric hydrates and/or solvates.

Particularly preferred are silicate-based materials, wherein i) the crystalline silicate material is not a hydrate of a silicate, in particular the silicate is free from water of crystallization. Also preferred are water free silicates. Adsorbed water or water on the surface of the silicate-based material is not regarded as hydrates of silicates or water from crystallization. Nevertheless, the silicate-based material is preferably free from adsorbed water and free from water on the surface of the particles of the material.

It is particular preferred for the crystallinity of the silicate-based material, in particular of the particles with a particle size distribution as disclosed above, to be greater than 70%, in particular the crystallinity of the material is more or equal to 80%, more preferred more or equal to 85%, 90%, 95%, most preferred more or equal to 98%, 99%, 99.5%, 99.8% (analysis e.g. determination of particle size via half width of peaks in a long term XRPD and Debye-Scherrer-equitation; the heights of the most intense reflex may also be used, XRPD, Rietveld-refinement).

In addition, the silicate-based material is in particular free from amorphous phases, wherein free from amorphous phases in the silicate-based material means less than 5%, preferred less than 2%, most preferred less than 1%, 0.01%, 0.001%, 0.0001% (analysis see above, XRPD, Rietveld-refinement).

More preferred are silicate-based materials, wherein the silicate-based material is a crystalline silicate material comprising i) a crystalline pure phase, in particular the crystalline material comprises a crystal phase, in particular one crystal phase, that encompasses 90 weight-% of the crystalline material, in particular the crystal phase encompasses more than or equal to 95 weight-%, preferred more than or equal to 98 weight-%, most preferred 99 weight-%, 99.5 weight-% or 99.8 weight-%, of the crystalline material (100 weight-%), or ii) the silica-based material comprises at least one crystal phase, in particular one crystal phase, that encompasses 90 weight-% of the silica-based material, in particular a crystal phase that encompasses more than or equal to 95 weight-%, more preferred a crystal phase that encompasses more than or equal to 98 weight-%, 99 weight-%, 99.5 weight-%, 99.8 weight-%, 99.9 weight-% of the silica-based material (100 weight-%).

Most preferred are silicate-based materials of a crystalline pure phase (e.g. free from different crystalline or amorphous phases).

According to another aspect of the invention the crystalline silicate material is preferably a solid solution of crystalline silicates doped with lanthanide ions comprising at least one alkali ion and at least one earth alkali ion, in particular the silicate is doped with praseodymium and optionally co-doped with gadolinium. Particular preferred are crystalline silicates doped with lanthanide selected from praseodymium and optionally gadolinium ions comprising at least one alkali ion selected from Li, Na, K, Rb, Cs, preferred selected from Li and optionally Na or K, most preferred selected from Li and optionally Na, and comprising at least one earth alkali ion selected from Mg, Ca, Sr, Ba, preferred selected from Ca. Most preferred are the above mentioned crystalline silicates, wherein the crystallinity is equal or above 90%, preferred equal or above 95%, and wherein the mean particle size $D_{50}$ is in the range of 1 micro meter to 20 micro meter, preferred in the range of 5 to 15 micro meter.

A preferred crystalline silicate material doped with lanthanide ions and comprising at least one alkali ion and at least one earth alkali ion is selected from water free or silicates free from water of crystallization, e.g. crystal water selected from cyclosilicates ($[Si_3O_9]^{6-}$, $[Si_4O_{12}]^{8-}$, $[Si_6O^{18}]^{12-}$), pyrosilicates ($[Si_2O_7]^{6-}$) and inosilicates (chain silicate, Si:O 1:3 (single chain), Si:O 4:11 double chain).

A particular preferred embodiment of the invention is a silicate-based material or silica-based materials, wherein the crystalline silicate material, is selected from the idealised general formula I $$A_{1-x-y-z}B^*{}_y B_2 SiO_4 : Ln^1{}_x, Ln^2{}_z, \qquad I$$

wherein x=0.0001-0.05, z=0 or z=0.0001 to 0.3 and y=x+z, wherein A is selected from Mg, Ca, Sr and Ba, wherein B is selected from Li, Na, K, Rb and Cs, wherein B* is selected from Li, Na and K, wherein B equal to B* or B being not equal to B*, preferred B and B* are not equal, and $Ln^1$ is selected from praseodymium (Pr), erbium (Er) and neodymium (Nd), optional $Ln^2$ is selected from gadolinium (Gd).

Most preferred are the above mentioned crystalline silicates of formula I, wherein the crystallinity is equal or above 90%, preferred equal or above 95%, and wherein the mean particle size $D_{50}$ is in the range of 1 micro meter to 20 micro meter, preferred in the range of 5 to 15 micro meter.

A further preferred embodiment of the invention is a silicate-based material or silica-based materials, wherein the crystalline silicate material, is selected from the idealised general formula Ia $$A_{1-x-y-z}B^*_yB_2SiO_4:Pr_xGd_z. \qquad Ia$$

wherein A=Mg, Ca, Sr, Ba and B=Li, Na, K, Rb, Cs, and, wherein in formula Ia x=0.0001-0.05, z=0 or z=0.0001 to 0.3 and y=x+z, wherein B* is selected from Li, Na and K, which are present for a charge balance of the silicate, wherein B equal to B* or B being not equal to B*, preferred B and B* are not equal, Most preferred are silicate-based materials, wherein the crystalline silicate material is selected from the idealised general formula II $$(Ca_{1-a}Sr_a)_{1-2b}Ln_bNa_bLi_2SiO_4 \qquad II$$

wherein a=0.0001 to 1, preferred 0.0001 to 0.1 and
b=0.0001 to 1, preferred 0.0001 to 0.1,
alternatively, a=0 or 0.0001 to 0.1, preferred a=0 and
b=0.0001 to 0.35, preferred b=0.001 to 0.1,
and Ln=lanthanide ions selected from praseodymium, gadolinium, erbium, neodymium and for co-doping at least two of them, in particular preferred are praseodymium and optionally gadolinium.

Preferred silicate-based lanthanide ion doped materials according to the invention are $A_{0.9998-0.9}B^*_{0.0001}-^{0.05}$ $B_2SiO_4:Pr_{0.00001}-^{0.05}$ and $A_{0.9998}-^{0.30}B^*_{0.0001}-^{0.35}$ $B_2SiO_4$: $Pr_{0.0001}-^{0.05}$ $Gd_{0.0001}-^{0.030}$, wherein A is selected from Mg, Ca, Sr, Ba and B is selected from Li, Na, K, Rb, Cs, preferred Li, Na, K, more preferred Li, and B* is selected from Na and K.

Particular preferred are $Ca_{0.98}Pr_{0.01}$ $Na_{0.01}$ $Li_2SiO_4$, $Ca_{0.96}Pr_{0.01}Gd_{0.01}Na_{0.02}Li_2SiO_4$, $Sr_{0.98}Pr_{0.01}Na_{0.01}$ $Li_2SiO_4$, $Sr_{0.96}Pr_{0.01}Gd_{0.01}$ $Na_{0.02}Li_2SiO_4$.

For example, the silicate-based crystalline materials according to the invention based on strontium as earth alkali ions, such as $SrLi_2SiO_4:Pr^{3+}$ show emissions at 254 to 375 nm, in particular with a maximum at 320 nm, and $SrLi_2SiO_4$: $Pr^{3+},Gd^{3+}$ with emissions at 254 to 375 nm, in particular with a maximum at 312 nm.

In particular the crystalline silicate material comprises at least two different alkali ions. More preferred the crystalline silicate material comprises at least one earth alkali ion and at least two different alkali ions.

According to one aspect of the invention the silicate-based material crystalline silicate material according to formula II possesses XRPD signals, in particular signals with a high intensity, in the range of 23° 2Θ to 27° 2Θ and of 34° 2Θ to 39.5° 2Θ, in particular in the range of 24.4° 2Θ° to 25.4° 2Θ and of 36.8° 2Θ to 37.8° 2Θ, wherein, in particular signals are measured according with a Bragg-Brentano geometry using Cu-Kα radiation.

Also, subject of the invention is silicate-based crystalline materials doped with praseodymium and are optional co-doped with gadolinium selected from the below mentioned list. It has surprisingly, turned out that these materials show rather efficient blue to UV radiation up-conversion:

$Mg_{1-x-y-z}Pr_xGd_zB^*_yLi_2SiO_4$ (x=0.0001-0.05, preferred 0.001-0.05, z=0) and optionally Gd (z=0.0001-0.3)

$Ca_{1-x-y-z}Pr_xGd_zB^*_yLi_2SiO_4$ (x=0.0001-0.05, preferred 0.001-0.05, z=0) and optionally Gd (z=0.0001-0.3)

$Sr_{1-x-y-z}Pr_xGd_zB^*_yLi_2SiO_4$ (x=0.0001-0.05, preferred 0.001-0.05, z=0) and optionally Gd (z=0.0001-0.3)

$Ba_{1-x-y-z}Pr_xGd_zB^*_yLi_2SiO_4:Pr$ (x=0.0001-0.05, preferred 0.001-0.05, z=0) and optionally Gd (z=0.0001-0.3)

$Mg_{1-x-y-z}Pr_xGd_zB^*_yNa_2SiO_4:Pr$ (x=0.0001-0.05, preferred 0.001-0.05, z=0) and optionally Gd (z=0.0001-0.3)

$Ca_{1-x-y-z}$ $Pr_xGd_zB^*_yNa_2SiO_4:Pr$ (x=0.0001-0.05, preferred 0.001-0.05, z=0) and optionally Gd (z=0.0001-0.3)

$Sr_{1-x-y-z}Pr_xGd_zB^*_yNa_2SiO_4:Pr$ (x=0.0001-0.05, preferred 0.001-0.05, z=0) and optionally Gd (z=0.0001-0.3)

$Ba_{1-x-y-z}$ $Pr_xGd_zB^*_yNa_2SiO_4:Pr$ (x=0.0001-0.05, preferred 0.001-0.05, z=0) and optionally Gd (z=0.0001-0.3)

$Mg_{1-x-y-z}$ $Pr_xGd_zB^*_yK_2SiO_4:Pr$ (x=0.0001-0.05, preferred 0.001-0.05, z=0) and optionally Gd (z=0.0001-0.3)

$Ca_{1-x-y-z}$ $Pr_xGd_zB^*_yK_2SiO_4:Pr$ (x=0.0001-0.05, preferred 0.001-0.05, z=0) and optionally Gd (z=0.0001-0.3)

$Sr_{1-x-y-z}$ $Pr_xGd_zB^*_yK_2SiO_4:Pr$ (x=0.0001-0.05, preferred 0.001-0.05, z=0) and optionally Gd (z=0.0001-0.3)

$Ba_{1-x-y-z}$ $Pr_xGd_zB^*_yK_2SiO_4:Pr$ (x=0.0001-0.05, preferred 0.001-0.05, z=0) and optionally Gd (z=0.0001-0.3)

$Mg_{1-x-y-z}$ $Pr_xGd_zB^*_yRb_2SiO_4:Pr$ (x=0.0001-0.05, preferred 0.001-0.05, z=0) and optionally Gd (z=0.0001-0.3)

$Ca_{1-x-y-z}$ $Pr_xGd_zB^*_yRb_2SiO_4:Pr$ (x=0.0001-0.05, preferred 0.001-0.05, z=0) and optionally Gd (z=0.0001-0.3)

$Sr_{1-x-y-z}$ $Pr_xGd_zB^*_yRb_2SiO_4:Pr$ (x=0.0001-0.05, preferred 0.001-0.05, z=0) and optionally Gd (z=0.0001-0.3)

$Ba_{1-x-y-z}$ $Pr_xGd_zB^*_yRb_2SiO_4:Pr$ (x=0.0001-0.05, preferred 0.001-0.05, z=0) and optionally Gd (z=0.0001-0.3), wherein in all formulas B* are additional alkali metals selected from Li, Na, K, and B* may be equal to B or may be different. Preferred is B and B* are selected from alkali metals and are different.

The particle sizes of the silica-based crystalline material is preferably in the range of 1 micro meter to 100 micro meter (μm), more preferred in the range from 1 micro meter to 50 micro meter (μm), more preferred from 1 micro meter to 20 micro meter (μm).

Preferably the mean particle size ($D_{50}$) of the silica-based crystalline material is preferably in the range of 1 micro meter to 100 micro meter (μm), more preferred in the range from 1 micro meter to 50 micro meter (μm), more preferred from 1 micro meter to 20 micro meter (μm). More preferably the mean particle size ($D_{50}$) of the silica-based crystalline material is in the range of 2 micro meter to 20 micro meter (μm), more preferred in the range from 5 micro meter to 20 micro meter (μm), more preferred of 5 micro meter to 15 micro meter (μm), in particular about 10 micro meter and −/+5 micro meter. According to one particular preferred embodiment the particle size distribution is $D_{10}$ 2 to 7 micro meter, $D_{50}$ 5 to 15 micro meter and $D_{90}$ below 20 micro meter, preferred below 18 micro meter. The particle size distribution was determined with dynamic laser light scattering, using a Horiba LA-950-V2 organic particle size analyser.

All inventive silicate-based crystalline materials comprise at least the trivalent activator $Pr^{3+}$, which ground state configuration $[Xe]4f^2$ delivers 13 $^5L_J$ levels located below the lowest crystal-field component of the excited configuration $[Xe]4f^15d^1$. By the proper choice of the host material the lowest crystal-field component of the excited configuration of $Pr^{3+}$ can be adjusted at 35000 to 40000 cm$^{-1}$ above the ground state level $^3H_4$ belonging to the ground state configuration. In this way, a two-photon absorption process at a single ion is enabled, which in turn can result in the emission of a UV photon.

Particularly $Pr^{3+}$ doped silicate-based materials according to the invention and treaded according to the invention, deliver blue to UV radiation up-converter materials, which are much more efficient than those published in patent and peer-reviewed literature so far.

According to a further subject of the invention silicate-based lanthanide doped materials are described that possess crystal-field components of the excited state configuration $[Xe]4f^15d^1$ located in the spectral range from 220 to 250 nm.

According to a further subject of the invention silicate-based lanthanide doped materials are described that possess crystal-field components of the excited state configuration $[Xe]4f^15d^1$ with emissions in the spectral range from 250 to 320 nm.

Particular preferred silicate-based materials are those in which electromagnetic radiation energy of a longer wavelength of below 500 nm, in particular from below 490 nm to 450 nm, is converted to electromagnetic radiation energy of shorter wavelengths in the range of 230 nm to 380 nm, in particular wherein the intensity of the emission maximum of electromagnetic radiation energy of the shorter wavelengths, in particular the at least one maximum of the emitted shorter wavelength or two maxima of the emitted shorter wavelength, has or have independently an intensity of at least $1 \cdot 10^3$ counts/$(mm^2 \cdot s)$, in particular more than $1 \cdot 10^4$ counts/$(mm^2 \cdot s)$, preferred more than $1 \cdot 10^5$ counts/$(mm^2 \cdot s)$ most preferred are more than $2 \cdot 10^5 \cdot$counts/$(mm^2 \cdot s)$. According to a preferred aspect of the invention preferred are two maxima with intensities of $1 \cdot 10^3$ counts/$(mm^2 \cdot s)$ in the range of the shorter wavelength of 230 nm to 275 nm and a second maxima in the range of 275 nm to 380 nm with an intensity of the maximum of at least than $1 \cdot 10^4$ counts/$(mm^2 \cdot s)$, preferred is more than $1 \cdot 10^5$ counts/$(mm^2 \cdot s)$, most preferred is more than $2 \cdot 10^5$ counts/$(mm^2 \cdot s)$. Wherein in particular the mentioned laser 445 nm 75 mW or 488 nm 150 mW are used.

To increase the emission, a certain particle size is most preferred. Therefore, the disclosed materials are described as µ-scale, sub-µ-scale to nanoscale particles in the range from 10 nm to 100 µm.

Also, subject of the invention is a process for the production of a silica-based material and the crystalline silicate-based material obtainable according the this process comprising the steps of
   i) providing at least one lanthanide salt, in particular selected from lanthanide nitrate, lanthanide carbonate, lanthanide carboxylate, in particular lanthanide acetate, lanthanide sulphate, lanthanide oxide, in particular $Pr_6O_{11}$ and/or $Gd_2O_3$,
wherein the lanthanide ion in the lanthanide oxide or lanthanide salt is selected from praseodymium, gadolinium, erbium, neodymium and for co-doping at least two of them,
   ii) providing a silicate, in particular a salt of a silicate, more particular an alkali salt of silicate,
   iii) providing at least one earth alkali salt and at least one alkali salt, in particular an alkali silicate, selected from lithium salt or any lithium compound and optional selected from sodium salt and potassium salt, preferably the salt of the lithium salt is the is selected from ii) and is a lithium silicate,
   a) blending i), ii) and iii) by milling and obtaining a mixture, or
   b) blending i), ii) and iii) in an organic polar or non-polar solvent that is not a protic solvent, and obtaining a mixture, the obtained mixture b) is calcinated (step 1a) at 600° C. to 1000° C. to remove organic components, in particular the calcination is performed at 600° C. to 1000° C. for at least 1 h, in particular more or equal to 2 h, under normal atmosphere (air) and obtaining a calcinated mixture,
calcination of the mixture of a) or the calcinated mixture of b) in a calcination step is performed, in particular under air, at a temperature below the melting temperature of the silica-based material, wherein at least partial crystallization occurs, in particular in a further calcination step (step1b) at a temperature of 50 to 200° C. for at least 3 h, preferred under air, below the melting temperature of the silica-based material to crystallize the silicate-based material, a preferred temperature is 800 to 900° C., preferred around 850° C., crystallization occurs for at least 3 h, in particular for at least 12 h, preferred under air,
in a further calcination step at elevated temperature, in particular above 800° C. and 50 to 200° C. below the melting point (step 2) of the material, e.g. at 850° C. for at least 3 h, more preferred at least 6 h, under reducing atmosphere the lanthanide is reduced to $Ln^{3+}$ Ions,
obtaining the silicate-based lanthanide ion doped material, in particular after cooling down of the material.

The reducing atmosphere may be forming gas such as a mixture of $N_2$ or argon and $H_2$. Alternative reducing atmospheres may comprise an inert gas and as reducing component a gas such as CO or $NH_3$.

The cooling down of the material is preferred performed by cooling down at a rate of 100° C./h to 300° C./h, preferred 200° C./h to 300° C./h.

Heating and cooling down in calcination steps 1a and/or 1b are each independently 100° C./h to 300° C./h, preferred are heating and cooling rates of 300° C./h. Heating and cooling down in calcination step 2 is performed at a rate of 100° C./h to 300° C./h, preferred is a heating and cooling rate of 200° C./h. Particular preferred are linear cooling rates.

In a preferred embodiment of the invention the obtained silicate-based lanthanide ion doped material is milled, in particular the material is subjected to tribological impacts in an amount that is sufficient to increase the crystallinity of the material, in particular the crystallinity of the main crystal phase of the silicate-based material, in relation to the material without subjection to tribological impacts. In particular amorphous phases are reduced and crystalline side phase are concerted to the main crystal phase. Preferred the intensity of a main reflex of the silicate-based lanthanide ion doped material is increased by at least 5%, in particular by 10%, more preferred by at least 20%. For the silicate according to formula II the intensity of a main reflex in the range of 34° 2Θ to 39.5° 2Θ is increased by at least 5%, more preferred by at least 10%.

Still a further embodiment of the invention is a process, wherein the obtained silicate-based material is subjected to tribological impacts using as milling material 200 rotation/min (rpm) for 1 to 6 hours, preferred for circa 4 hours. Milling is performed in a planetary ball mill (PM 200, Retsch), g-force up to: 37.1 g, beaker/jar: corundum and grinding balls $(Al_2O_3)$, 50 ml (9 balls, sample ca. 4.5 g) or 125 ml (24 balls, sample ca. 20 g). The grinding beakers/jars are arranged eccentrically on the sun wheel of the planetary ball mill. Direction of movement of the sun wheel is opposite to that of the grinding jars in the ratio 1:−2. The grinding balls in the grinding beakers/jars are subjected to superimposed rotational movements, the so-called Coriolis forces. The difference in speeds between the balls and jars produces an interaction between frictional and impact forces, which releases high dynamic energies.

Preferred the intensity of a main reflex of the obtained silicate-based lanthanide ion doped material can be increased by a milling step at least 25%, in particular by 30%, more preferred by at least 40%, 50%, 60%, 70% or 80%. For the silicate according to formula II the intensity of a main reflex in the range of 34° 2Θ to 39.5° 2Θ is increased by at least 50%, more preferred by at least 60%. Preferably, this milling step is the first milling step in the process to reduce particle size and to reduce undesired phases in the solid.

Subject of the invention are also silicate-based lanthanide ion doped material for converting electromagnetic radiation energy of a longer wavelength to electromagnetic radiation energy of shorter wavelength, obtainable according to the process of invention, wherein the silicate-based material is a crystalline silicate material doped with lanthanide ions selected from praseodymium, gadolinium, erbium, neodymium and for co-doping at least two of them, and, wherein the crystalline silicate-based material doped with lanthanide ions is a solid solution of crystalline silicates comprising at least one alkali ion, preferred are at least two different alkali ions, and at least one earth alkali ion, and wherein the crystallinity of the silicate-based material is greater than 80%, in particular the crystallinity of the material is more or equal than 80%, more or equal than 85%, 90%, 95%, more or equal 98%, 99%, 99.5%, 99.8%, wherein electromagnetic radiation energy of at least one longer wavelength of below 530 nm, in particular in the range of 490 to 450 nm, is converted to electromagnetic radiation energy of at least one shorter wavelength in the range of 220 to 400 nm, in particular in the range of 250 to 320 nm.

Wherein the longer wavelength is per definition always longer than the shorter wavelength.

According to a further embodiment a composition, foil or film comprising silicate-based material is disclosed for self-disinfection purposes or for reduction of microorganisms. The composition may contain any excipient, wherein the composition does not contain water or protic solvents in an amount above 1 to 15 weight-%, in particular above 10 weight-%.

Subject of the invention is also the use of a silicate-based lanthanide ion doped material in UV sterilization or disinfection applications, in indoor UV sterilization applications, in particular indoor UV sterilization application utilizing electromagnetic radiation energy from LEDs, in particular pcLEDs, comprising emission maxima in the range of 450 to 480 nm under exposure of electromagnetic radiation energy of a longer wavelength of below 500 nm, in particular with emission maxima in the range of 450 to 480 nm.

EMBODIMENTS

Measurement Techniques

The X-ray diffractograms were recorded by using a Panalytical X'Pert PRO MPD diffractometer working in Bragg-Brentano geometry using Cu-Kα radiation and a line-scan CCD sensor. The integration time amounted to 20 s with a step size of 0.017°.

Emission spectra were recorded on an Edinburgh Instruments FLS920 spectrometer equipped with a 488 nm continuous-wave OBIS Laser by Coherent and a Peltier cooled (−20° C.) single-photon counting photomultiplier (Hamamatsu R2658P). Filters were used to suppress excitation by second order reflexes caused by the monochromators.

Milling is performed in a planetary ball mill (PM 200, Retsch), beaker/jar: corundum and grinding balls (Al2O3), 50 ml (9 balls, sample ca. 4.5 g) or 125 ml (24 balls, sample ca. 20 g) for 4 hours at 200 rotation/min after cooling of the final calcination step. Reducing atmosphere ($H_2$/Inert gas, in particular $H_2/N_2$, preferred ($H_2$ (5%)/$N_2$ (95%))).

Powder Sample Synthesis

Example 1: $Ca_{0.98}Pr_{0.01}Na_{0.01} Li_2SiO_4$ 3.3349 g (33.3200 mmol) $CaCO_3$, 3.0588 g (34.0000 mmol) $Li_2SiO_3$, 0.1479 g (0.3400 mmol) $Pr(NO_3)_3.6H_2O$ and 0.0180 g (0.1700 mmol) $Na_2CO_3$ were blended in hexane in an agate mortar. $Na_2CO_3$ was used for charge compensation of $Ca^{2+}/Pr^{3+}$. This precursor blend was calcined at 700° C. for two hours in air to remove organic residues. Subsequent calcination at 850° C. for 12 h in air was carried out to obtain the product phase. A final calcination step at 850° C. for six hours in reducing atmosphere is necessary to reduce $Pr^{4+}$ to $Pr^{3+}$.

Example 2: $Ca_{0.96}Pr_{0.01} Gd_{0.01} Na_{0.02}Li_2SiO_4$ 3.2668 g (32.6400 mmol) $CaCO_3$, 3.0588 g (34.0000 mmol) $Li_2SiO_3$, 0.1479 g (0.3400 mmol) $Pr(NO_3)_3.6H_2O$, 0.0616 g (0.1700 mmol) $Gd_2O_3$ and 0.0360 g (0.3400 mmol) $Na_2CO_3$ were blended in hexane in an agate mortar. $Na_2CO_3$ was used for charge compensation of $Ca^{2+}/Pr^{3+}$. This precursor blend was calcined at 700° C. for two hours in air to remove organic residues. Subsequent calcination at 850° C. for 12 h in air was carried out to obtain the product phase. A final calcination step at 850° C. for six hours in reducing atmosphere is necessary to reduce $Pr^{4+}$ to $Pr^{3+}$.

Example 3: $Sr_{0.98}Pr_{0.01}Na_{0.01}Li_2SiO_4$ 3.6169 g (24.5000 mmol) $SrCO_3$, 2.2491 g (25.0000 mmol) $Li_2SiO_3$, 0.1088 g (0.2500 mmol) $Pr(NO_3)_3.6H_2O$ and 0.0132 g (0.1250 mmol) $Na_2CO_3$ were blended in hexane in an agate mortar. $Na_2CO_3$ was used for charge compensation of $Ca^{2+}/Pr^{3+}$. This precursor blend was calcined at 700° C. for two hours in air to remove organic residues. Subsequent calcination at 850° C. for 12 h in air was carried out to obtain the product phase. A final calcination step at 850° C. for six hours in reducing atmosphere is necessary to reduce $Pr^{4+}$ to $Pr^{3+}$.

Example 4: $Sr_{0.96}Pr_{0.01}Gd_{0.01}Na_{0.02}Li_2SiO_4$ 4.8186 g (32.6400 mmol) $SrCO_3$, 3.0588 g (34.0000 mmol) $Li_2SiO_3$, 0.1479 g (0.3400 mmol) $Pr(NO_3)_3.6H_2O$, 0.0616 g (0.1700 mmol) $Gd_2O_3$ and 0.0360 g (0.3400 mmol) $Na_2CO_3$ were blended in hexane in an agate mortar. $Na_2CO_3$ was used for charge compensation of $Ca^{2+}/Pr^{3+}$. This precursor blend was calcined at 700° C. for two hours in air to remove organic residues. Subsequent calcination at 850° C. for 12 h in air was carried out to obtain the product phase. A final calcination step at 850° C. for six hours in reducing atmosphere is necessary to completely reduce $Pr^{4+}$ to $Pr^{3+}$.

Comparative Example 1

As comparative example other lanthanide doped silicate systems disclosed in the below mentioned publication were produced and measured under same conditions (Visible-to-UVC up-conversion efficiency and mechanisms of $Lu_7O_6F_9$:$Pr^{3+}$ and $Y_2SiO_5$:$Pr^{3+}$ ceramics, Cates, Ezra L.; Wilkinson, Angus P.; Kim, Jae-Hong, Journal of Luminescence 160 (2015) 202-209; Abstract: Visible-to-UVC up-conversion (UC) by $Pr^{3+}$-doped materials is a promising candidate for application to sustainable disinfection technologies, including light-activated antimicrobial surfaces and solar water treatment. In this work, we studied $Pr^{3+}$ up-conversion in an oxyfluoride host system for the first time, employing $Lu_7O_6F_9:Pr^{3+}$ ceramics. Compared to the previously studied $Y_2SiO_5:Pr^{3+}$ reference material, the oxyfluoride host resulted in a 5-fold increase in intermediate state lifetime, likely due to a lower maximum phonon energy; however, only a 60% gain in UC intensity was observed. To explain this discrepancy, luminescence spectral distribution and decay kinetics were studied in both phosphor systems. The $Pr^3+4f5d$ band energy distribution in each phosphor was found to play a key role by allowing or disallowing the occurrence of a previously unexplored UC mechanism, which had a significant impact on overall efficiency.

$Lu_7O_6F_9:Pr^{3+}$: Could not be obtained under disclosed temperature and a synthesis under increased temperature and a pressure of 350 MPa was not able due to the availability of a temperable press.

$Y_2SiO_5:Pr^{3+}$ was as synthesized according to the publication as a pure phase.

Comparative Example 2

As a further comparative example, a lanthanide doped silicate is produced under the conditions disclosed in the US 2013/0052079 regarding the calcination temperature:

3.3349 g (33.3200 mmol) $CaCO_3$, 2.5123 g (34.0000 mmol) $Li_2CO_3$, 0.1479 g (0.3400 mmol) $Pr(NO_3)_3.6H_2O$ and 0.0180 g (0.1700 mmol) $Na_2CO_3$ were blended in hexane in an agate mortar. $Na_2CO_3$ was used for charge compensation of $Ca^{2+}/Pr^{3+}$. This precursor blend was calcined at 700° C. for two hours in air to remove organic residues. Subsequent calcination at 1100° C. (and temperatures above) for 12 h in air yields in an amorphous and glassy product, which stuck at the crucible. It was not possible to separate the amorphous product from the $Al_2O_3$ crucible.

Grinding Attempts

The planetary ball mill PM 200 from Retsch was used also used for the following grinding. The inner wall of the grinding bowls and the grinding balls are made of corundum ($Al_2O_3$). Two different grinding bowls were used: 50 and 125 ml. Depending on the size, nine or 24 grinding balls were used. Depending on their size, the bowls were also filled with 4.5 g or 20 g sample. The speed of the grinding bowls is 200 rpm. The grinding time is 4 hours. Operating principle: The grinding bowls are arranged eccentrically on the sun wheel of the planetary ball mill. The rotational movement of the sun wheel is counter-rotating to that of the grinding bowl in the ratio 1:−2. The grinding balls in the grinding bowl are influenced by superimposed rotational movements, so-called Coriolis forces. The speed differences between balls and grinding bowls lead to an interaction of friction and impact forces, releasing high dynamic energies. The interaction of these forces causes the high and very effective degree of comminution of the planetary ball mills.

Figure 27A:
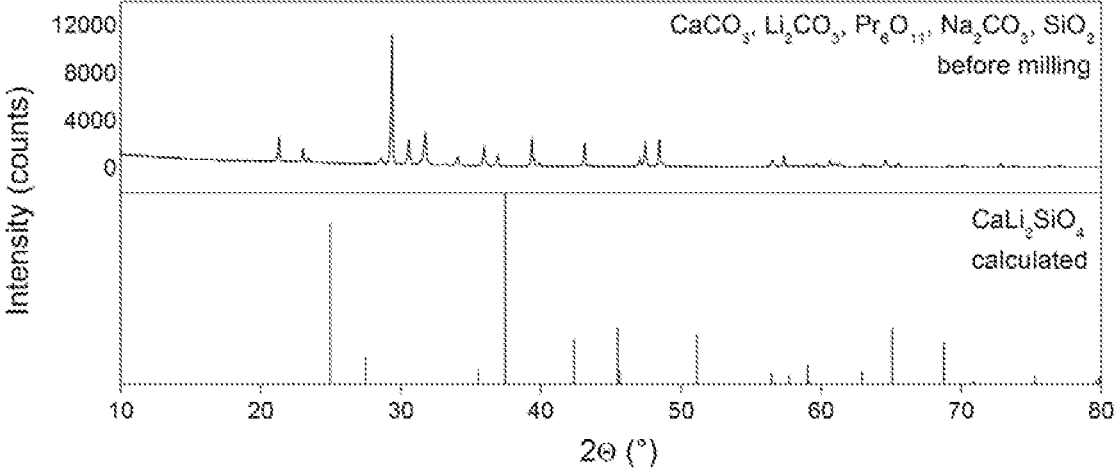
FIG. 27A shows an XRPD of educts before milling on top and an XRPD of $CaLi_2SiO_4$ calculated below.
Figure 27B:
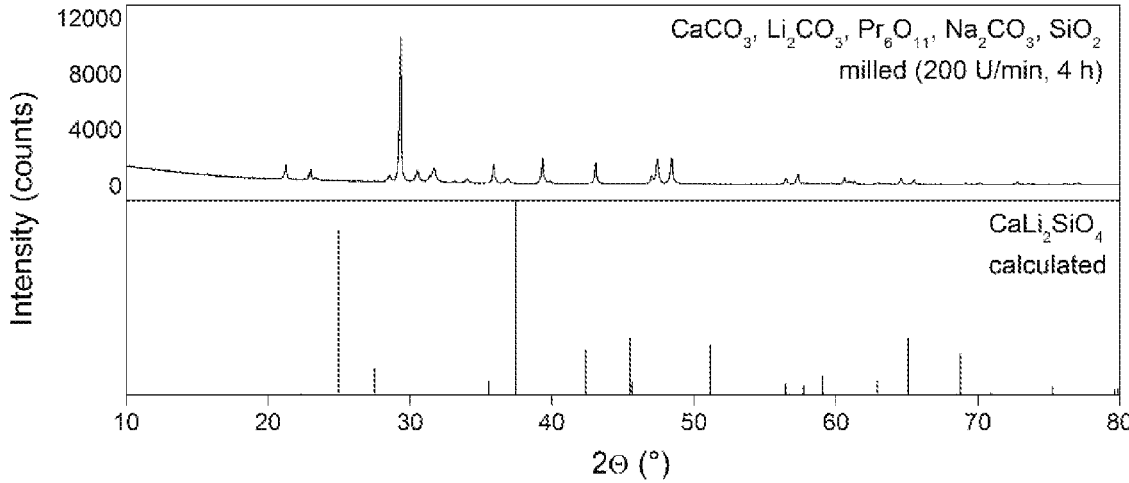
FIG. 27B shows an XRPD of milled educts on top, and an XRPD of $CaLi_2SiO_4$ calculated below.

First an XRD of the untreated educts ($CaCO_3$, $Li_2CO_3$, $Pr_6O_{11}$, $Na_2CO_3$ and $SiO_2$) was recorded, FIG. 27A. The educt mixture was then treated in the above-mentioned planetary ball mill (200 rpm for 4 hours, FIG. 27B: XRPD). The powder diffraction pattern indicates that the target phase does not exist (FIG. 27B). Thus it can be stated that the energy input during grinding is not sufficient to synthesize the target phase. The exact value of the energy input cannot be calculated.

Figure 27C:
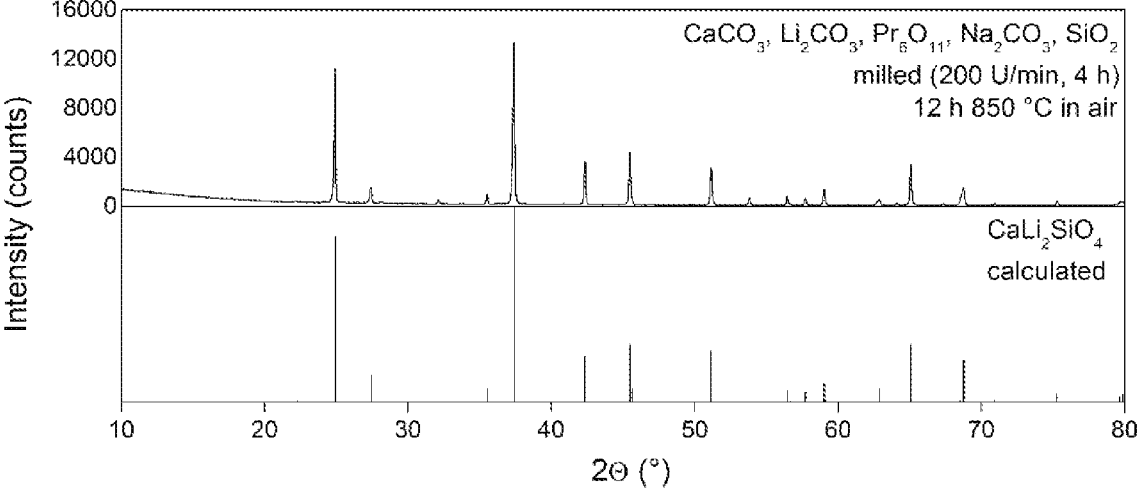
FIG. 27C shows a silicate-based lanthanide ion doped material heating (calcination) of milled for 12 h at 850° C. in air, reflex $2\Theta=37.39°$ with 13357 counts on top, and an XRPD of $CaLi_2SiO_4$ calculated below.

The powder was then sintered in air at 850° C. for 12 hours:

After this step, the reactant mixture has reacted to the target phase. The most intense reflex at $2\Theta=37.39^0$ has an intensity of 13357 counts (FIG. 27C).

After this sintering step, the powder shows a brown body colour, since $Pr^{4+}$ is present in addition to $Pr^{3+}$. The latter must be reduced with a second sintering step (6 hours at 850° C.) under forming gas ($H_2$ (5%)/$N_2$ (95%)).

Figure 27D:
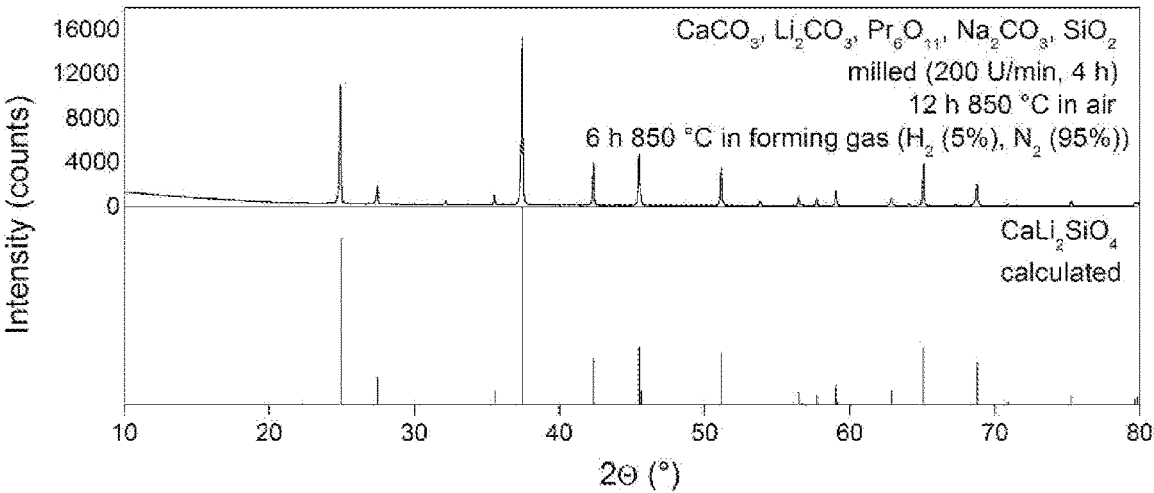
FIG. 27D shows a second heating 6 h, 850° C. forming gas ($H_2$(5%)/$N_2$(95%)), reflex $2\Theta =37.39°$ with 15423 counts on top, and an XRPD of $CaLi_2SiO_4$ calculated below.

After this step, see FIG. 27D, the most intense reflex has an intensity of 15423 counts. The crystallinity can therefore be increased with this sintering step. A renewed grinding leads, see FIG. 27E, to a decrease of the crystallinity. The number of counts of the reflex is reduced to 13576.

Figure 28A:
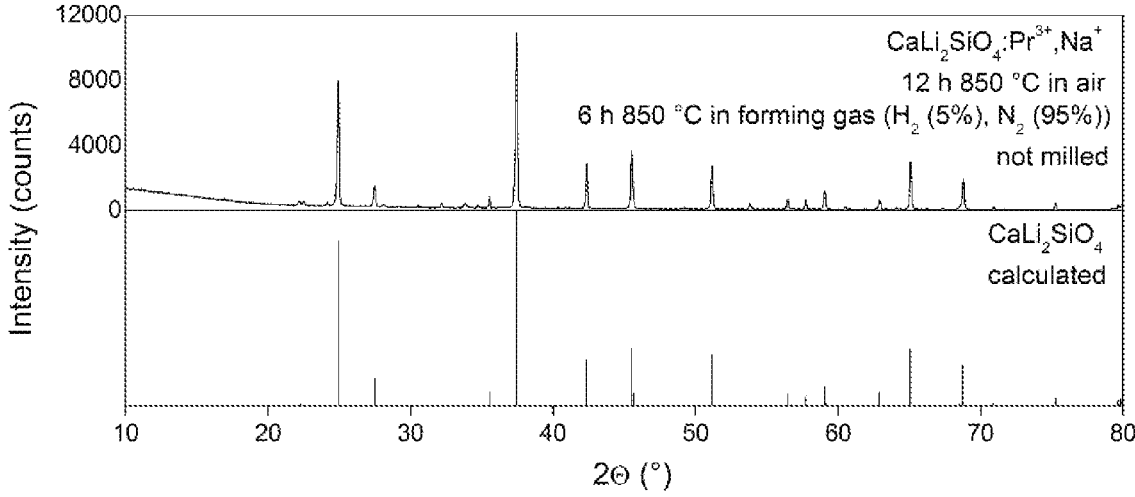
FIG. 28A shows a silicate-based lanthanide ion doped material ($CaLi_2SiO_4$: $Pr^{3+}$,$Na_+$) heating (calcination) for 12 h at 850° C. in air and afterwards in a reducing atmosphere at elevated temperature ($H_2$/inert gas, 6h 850° C., not milled): reflex $2\Theta =37.3°$, 10964 counts on top; and an XRPD of $CaLi_2SiO_4$ calculated below.
Figure 28B:
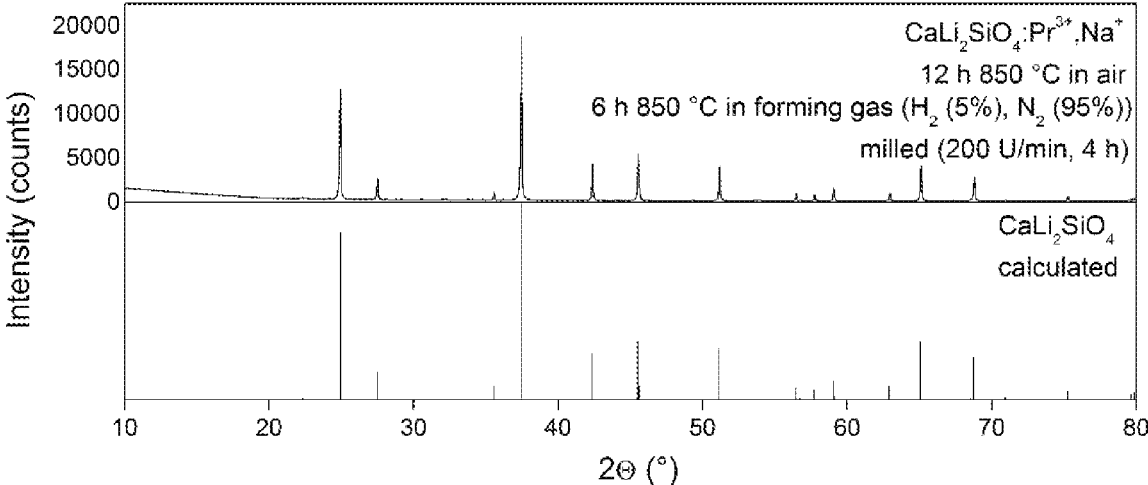
FIG. 28B shows a milled silicate-based lanthanide ion doped material after tempering in reducing atmosphere, reflex $2\Theta=37.39°$, 18665 counts, (milling: 4 h 200 rpm, $CaLi_2SiO_4$: $Pr^{3+}$, $Na^+$), on top; and an XRPD of $CaLi_2SiO_4$ calculated below.

In a second series of experiments $CaLi_2SiO_4:Pr,Na$ was presented using conventional synthesis. For this purpose, the starting materials were mixed with acetone in an agate mortar and then sintered in air at 850° C. for 12 hours. The second sintering step was then carried out under forming gas (FIG. 28A: XRPD). The most intensive reflex has an intensity of 10964 counts. Then the powder sample was ground as described above:

After grinding, in particular for 4 h at 200 rpm, see FIG. 28B, the intensity of the observed reflex rose to 18665 counts. Consequently, the crystallinity can be significantly increased by subsequent grinding. In addition, it can be observed that various foreign phase reflexes also disappear during grinding.

A previous grinding of the educts does not lead to a higher crystallinity of the target phase than the subsequent grinding. In addition, foreign phase reflexes can still be observed after the sintering steps if the starting materials have been ground before sintering.

DESCRIPTION OF FIGURES

Figure 1A:
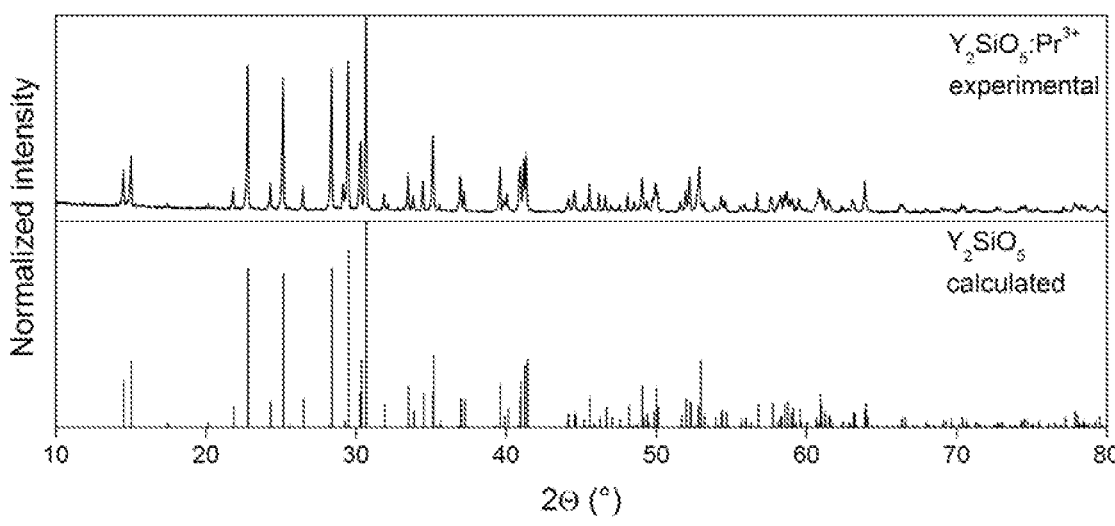
FIG. 1A shows an X-ray powder diffraction (XRPD) of synthesized $Y_2SiO_5$ upper XRPD and calculated XRPD of $Y_2SiO_5$.

FIG. 1A: X-ray powder diffraction (XRPD) of synthesized $Y_2SiO_5$ upper XRPD and calculated XRPD of $Y_2SiO_5$.

Figure 1B:
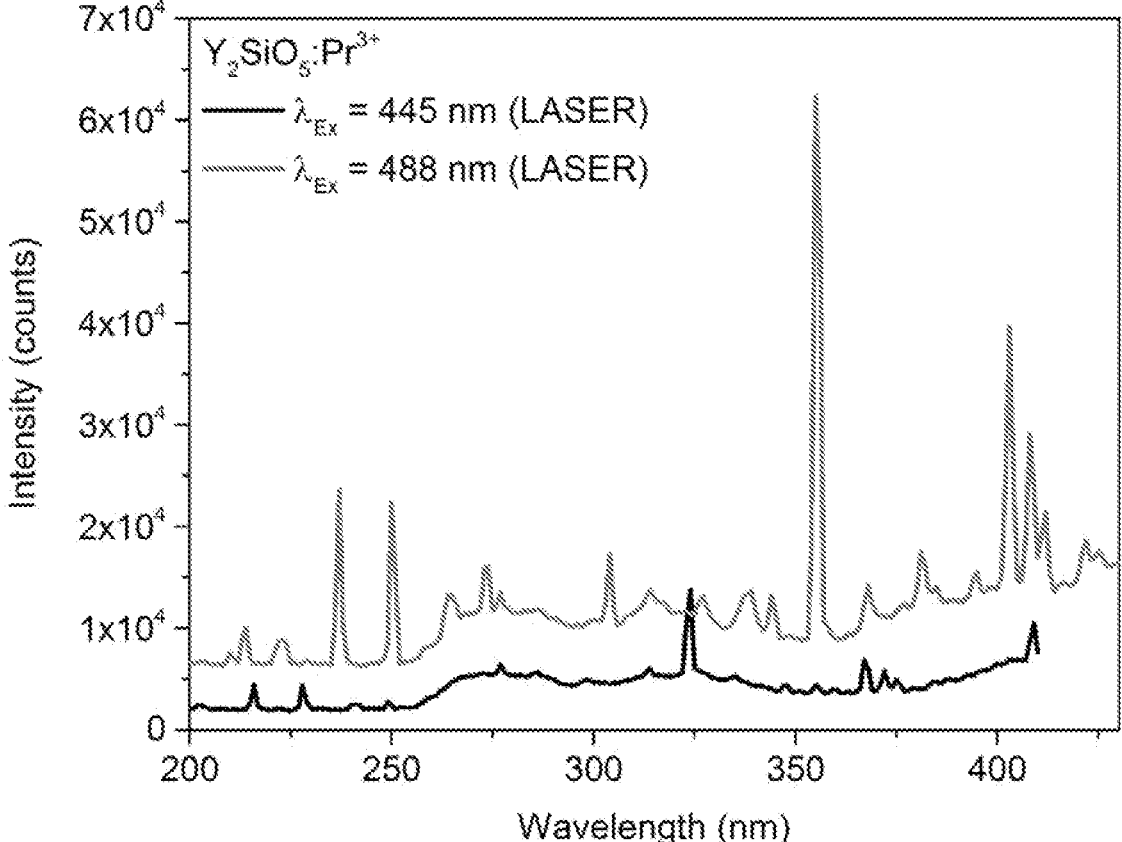
FIG. 1B shows an emission spectrum of $Y_2SiO_5$: $Pr^{3+}$ upon excitation at 445 nm (75 mW) and 488 nm (150 mW) by Lasers.

FIG. 1B: Emission spectrum of $Y_2SiO_5:Pr^{3+}$ upon excitation at 445 nm (75 mW) and 488 nm (150 mW) by Lasers.

Figure 2:
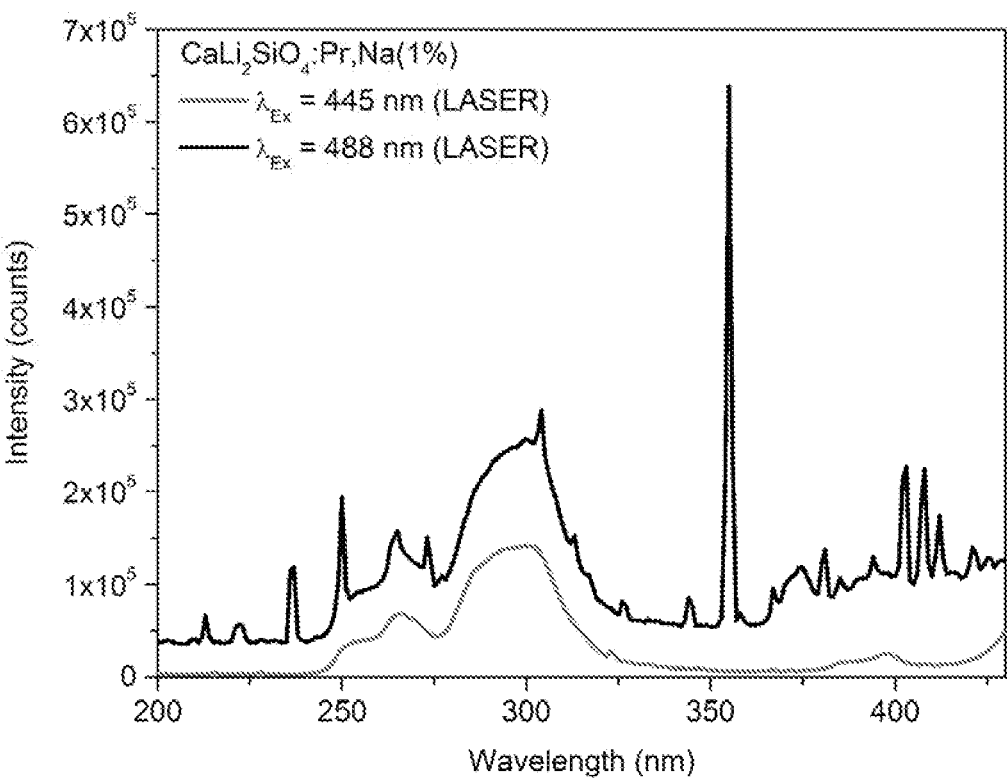
FIG. 2 shows an emission spectrum of $Ca_{0.98}Pr_{0.01}Na_{0.01}Li_2SiO_4$ upon excitation at 445 nm (75 mW) and 488 nm (150 mW) by Lasers.

FIG. 2: Emission spectrum of $Ca_{0.98}Pr_{0.01}Na_{0.01}Li_2SiO_4$ upon excitation at 445 nm (75 mW) and 488 nm (150 mW) by Lasers.

Figure 3:
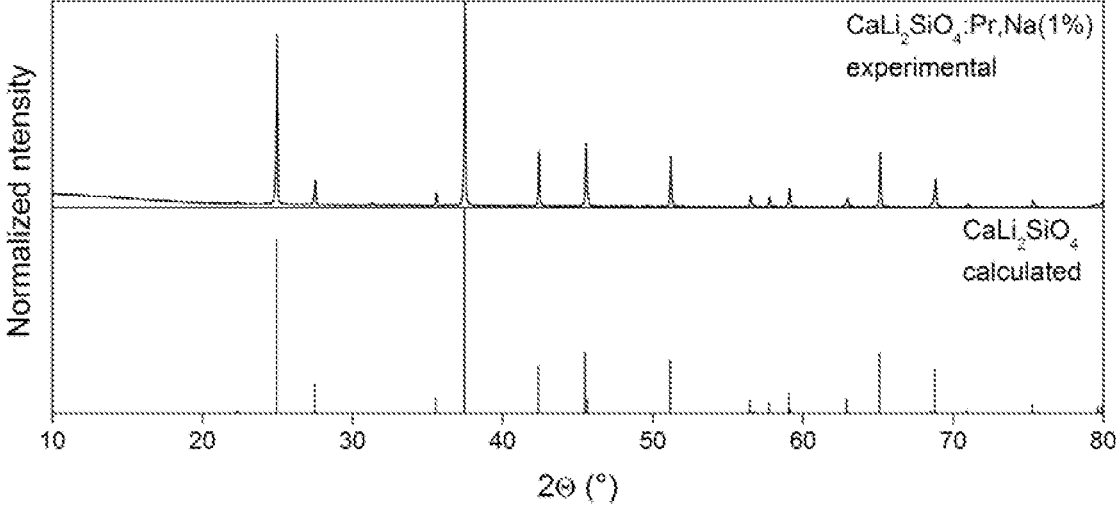
FIG. 3 shows an X-ray diffraction pattern of $Ca_{0.98}Pr_{0.01}Na_{0.01}Li_2SiO_4$ for Cu-$K_\alpha$ radiation (Example 1).

FIG. 3: X-ray diffraction pattern of $Ca_{0.98}Pr_{0.01}Na_{0.01}Li_2SiO_4$ for Cu—$K_\alpha$ radiation (Example 1).

Figure 4:
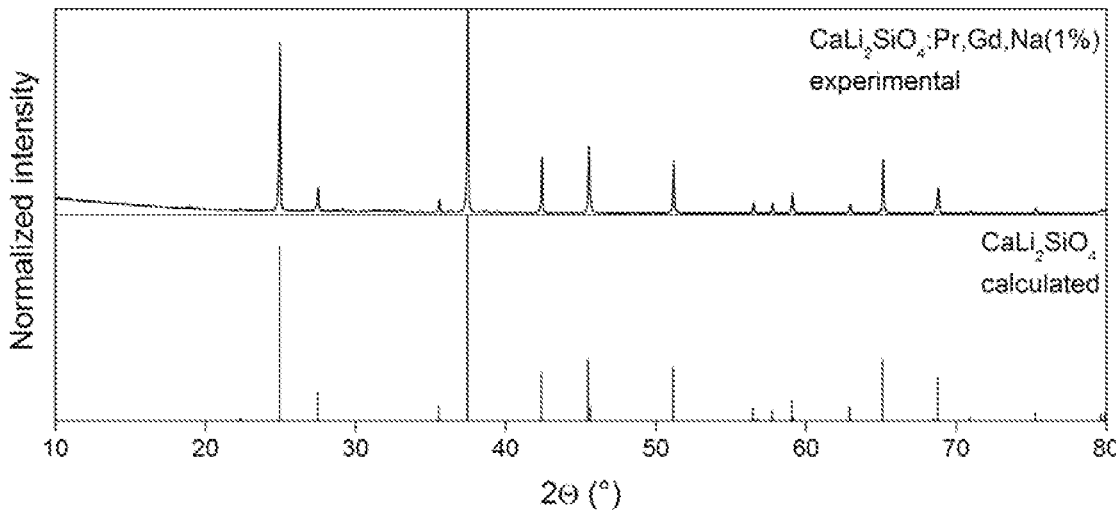
FIG. 4 shows an X-ray diffraction pattern of $Ca_{0.96}Pr_{0.01}Gd_{0.01}Na_{0.02}Li_2SiO_4$ for Cu-$K_\alpha$ radiation (Example 2).

FIG. 4: X-ray diffraction pattern of $Ca_{0.96}Pr_{0.01}Gd_{0.01}Na_{0.02}Li_2SiO_4$ for Cu—$K_\alpha$ radiation (Example 2).

Figure 5:
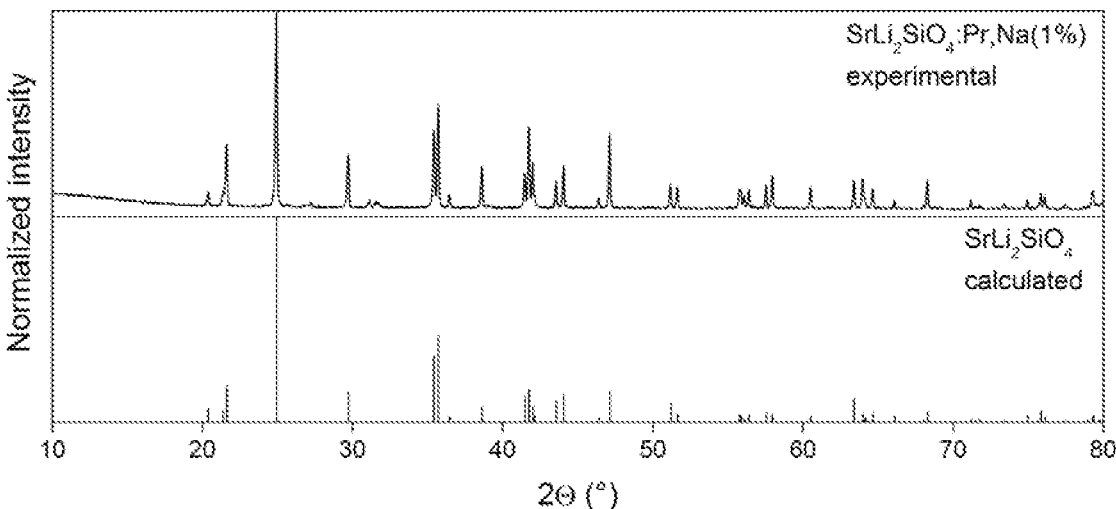
FIG. 5 shows an X-ray diffraction pattern of $Sr_{0.98}Pr_{0.01}Na_{0.01}Li_2SiO_4$ for Cu-$K_a$ radiation (Example 3).

FIG. 5: X-ray diffraction pattern of $Sr_{0.98}Pr_{0.01}Na_{0.01}Li_2SiO_4$ for Cu—$K_\alpha$ radiation (Example 3).

Figure 6:
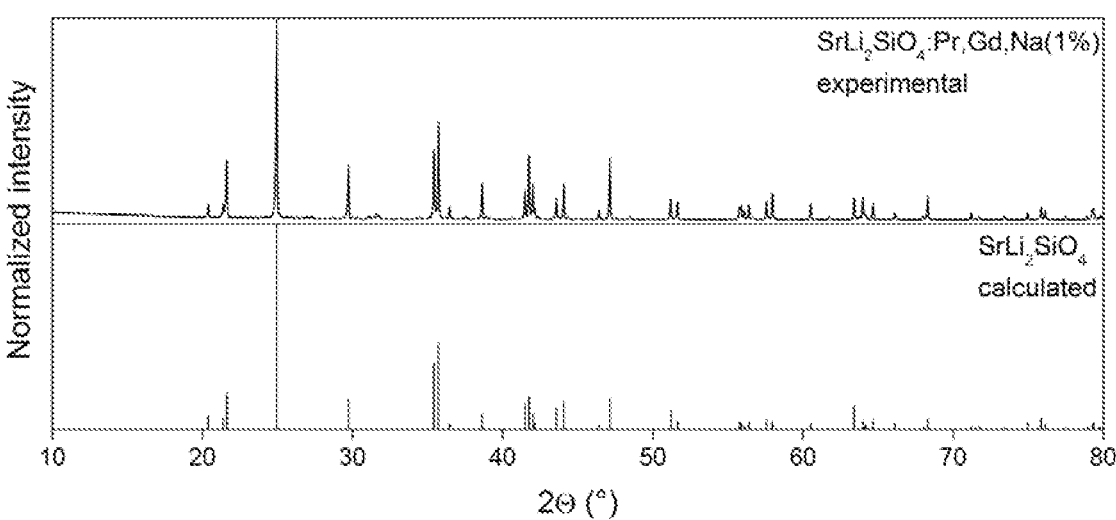
FIG. 6 shows an X-ray diffraction pattern of $Sr_{0.96}Pr_{0.01}Gd_{0.01}Na_{0.02}Li_2SiO_4$ for Cu-$K_a$radiation (Example 4).

FIG. 6: X-ray diffraction pattern of $Sr_{0.96}Pr_{0.01}Gd_{0.01}Na_{0.02}Li_2SiO_4$ for Cu—$K_\alpha$ radiation (Example 4).

Figure 7:
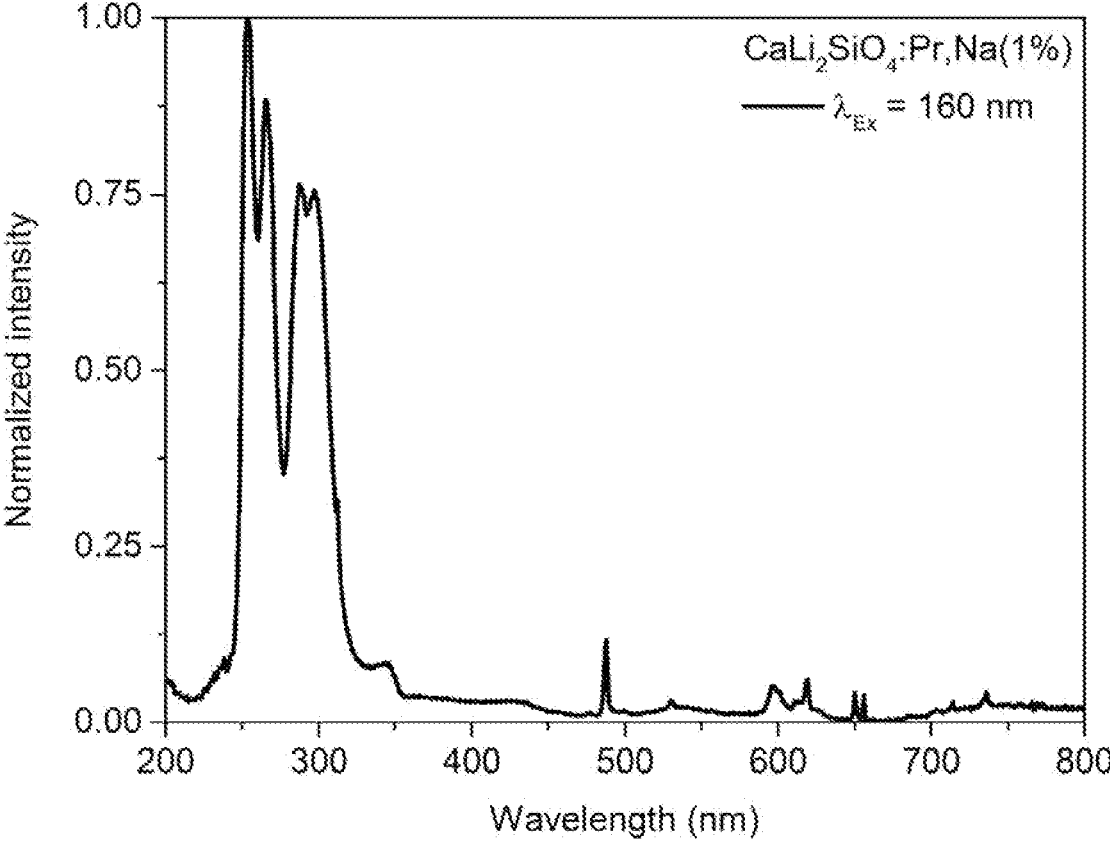
FIG. 7 shows an emission spectrum of $Ca_{0.98}Pr_{0.01}Na_{0.01}Li_2SiO_4$ upon excitation at 160 nm (Example 1).

FIG. 7: Emission spectrum of $Ca_{0.98}Pr_{0.01}Na_{0.01}Li_2SiO_4$ upon excitation at 160 nm (Example 1).

Figure 8:
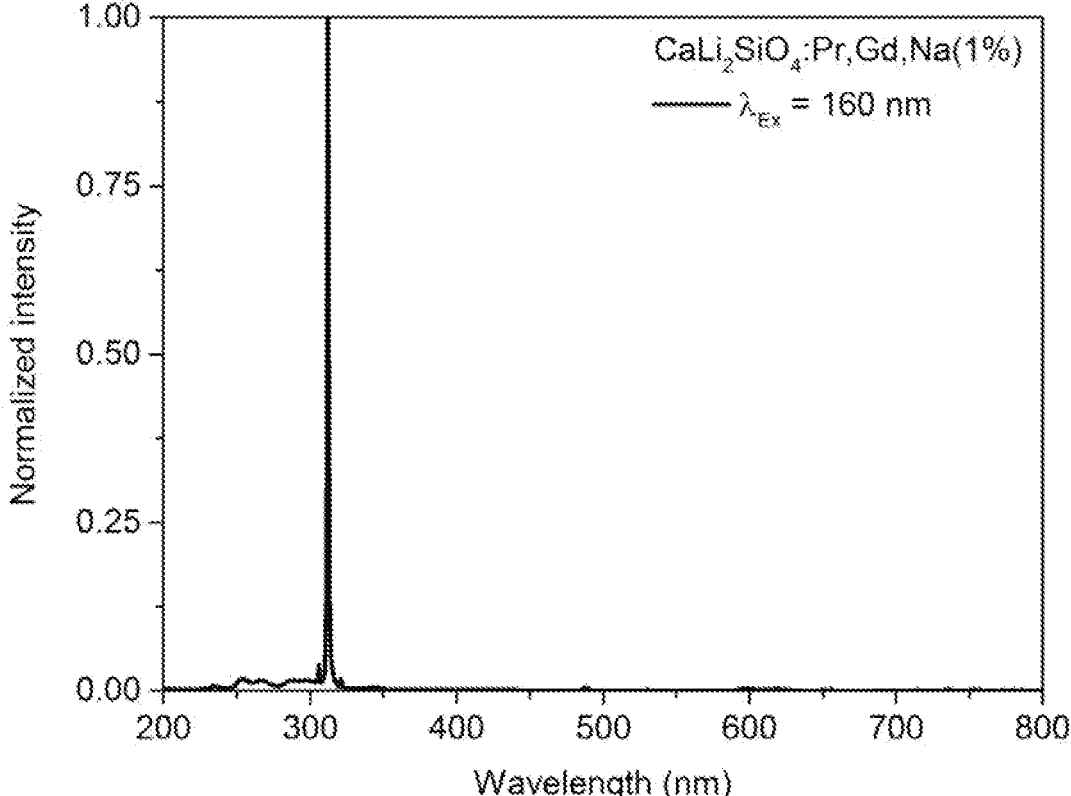
FIG. 8 shows an emission spectrum of $Ca_{0.96}Pr_{0.01}Gd_{0.01}Na_{0.02}Li_2SiO_4$ upon excitation at 160 nm (Example 2).

FIG. 8: Emission spectrum of $Ca_{0.96}Pr_{0.01}Gd_{0.01}Na_{0.02}Li_2SiO_4$ upon excitation at 160 nm (Example 2).

Figure 9:
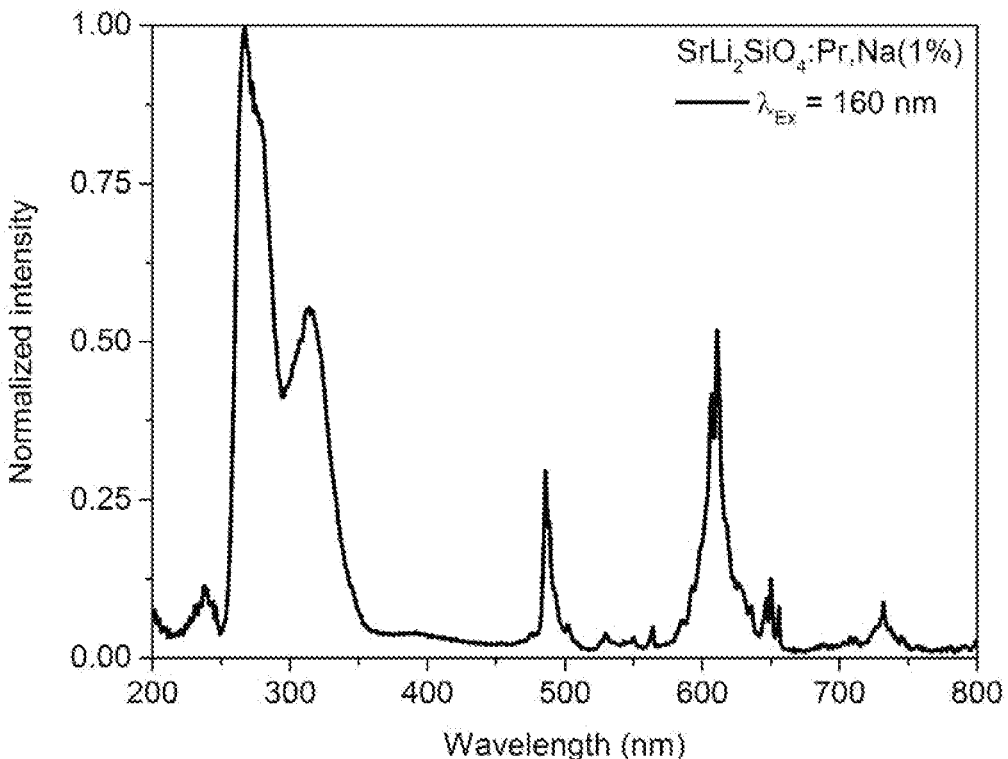
FIG. 9 shows an emission spectrum of $Sr_{0.98}Pr_{0.01}Na_{0.01}Li_2SiO_4$ upon excitation at 160 nm (Example 3).

FIG. 9: Emission spectrum of $Sr_{0.98}Pr_{0.01}Na_{0.01}Li_2SiO_4$ upon excitation at 160 nm (Example 3).

Figure 10:
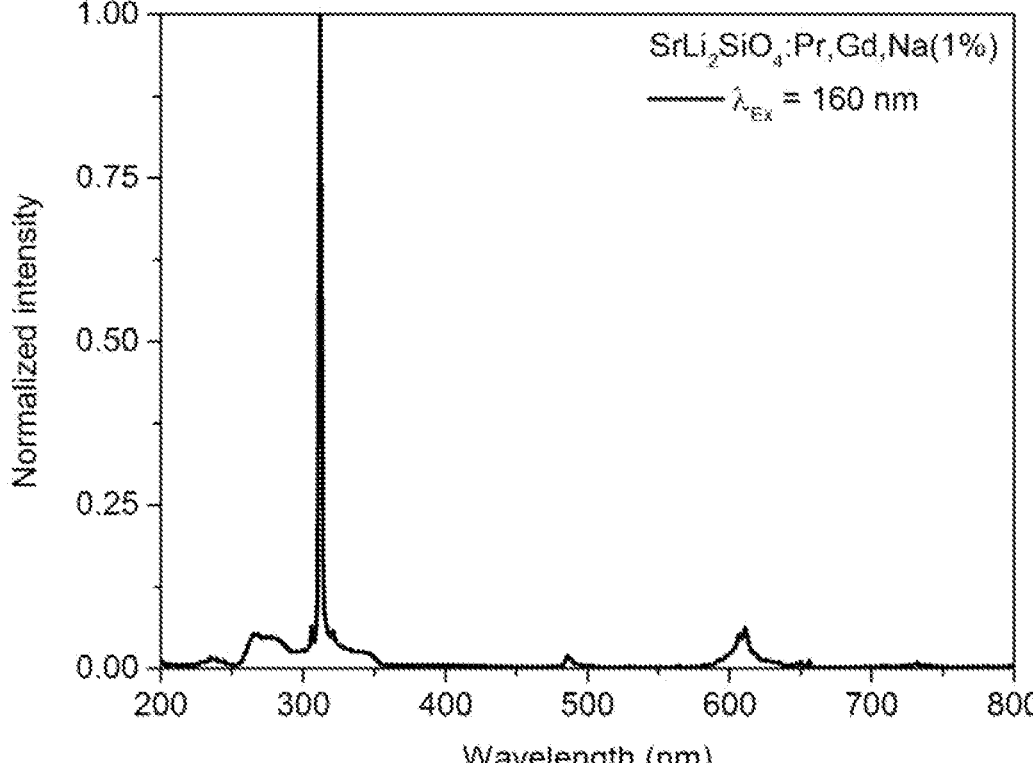
FIG. 10 shows an emission spectrum of $Sr_{0.96}Pr_{0.01}Gd_{0.01}Na_{0.02}Li_2SiO_4$ upon excitation at 160 nm (Example 4).

FIG. 10: Emission spectrum of $Sr_{0.96}Pr_{0.01}Gd_{0.01}Na_{0.02}Li_2SiO_4$ upon excitation at 160 nm (Example 4).

FIG. 11: Emission spectrum of $Ca_{0.98}Pr_{0.01}Na_{0.01}Li_2SiO_4$ upon excitation at 445 nm (75 mW) and 488 nm (150 mW) by Lasers (Example 1).

FIG. 12: Emission spectrum of $Ca_{0.96}Pr_{0.01}Gd_{0.01}Na_{0.02}Li_2SiO_4$ upon excitation at 445 nm (75 mW) and 488 nm (150 mW) by Lasers (Example 2).

Figure 13:
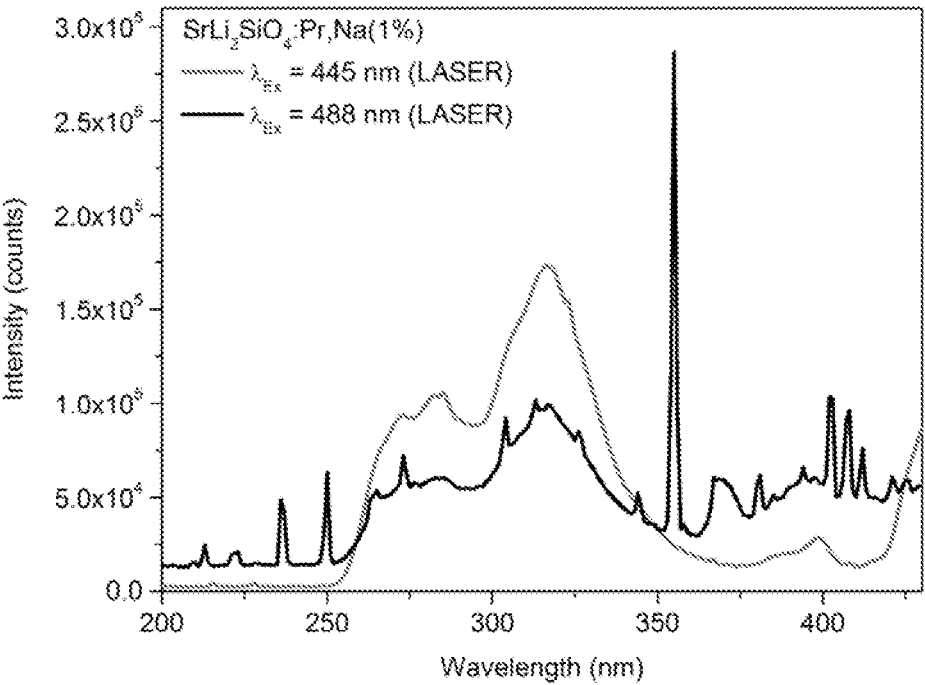
FIG. 13 shows an emission spectrum of $Sr_{0.98}Pr_{0.01}Na_{0.01}Li_2SiO_4$ upon excitation at 445 nm (75 mW) and 488 nm (150 mW) by Lasers (Example 3).

FIG. 13: Emission spectrum of $Sr_{0.98}Pr_{0.01}Na_{0.01}Li_2SiO_4$ upon excitation at 445 nm (75 mW) and 488 nm (150 mW) by Lasers (Example 3).

Figure 14:
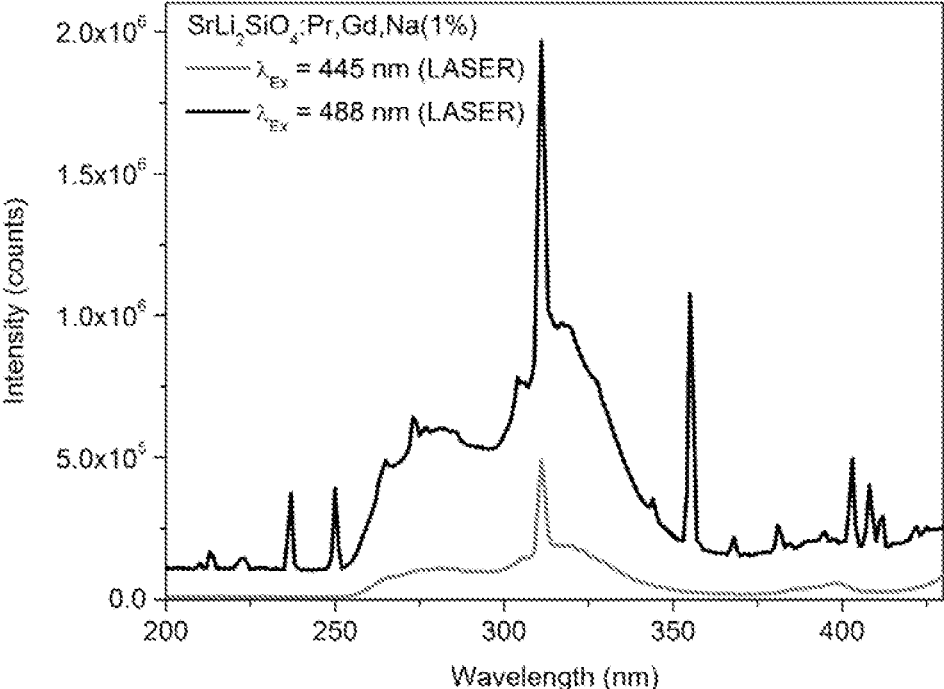
FIG. 14 shows an emission spectrum of $Sr_{0.96}Pr_{0.01}Gd_{0.01}Na_{0.02}Li_2SiO_4$ upon excitation at 445 nm (75 mW) and 488 nm (150 mW) by Lasers (Example 4).

FIG. 14: Emission spectrum of $Sr_{0.96}Pr_{0.01}Gd_{0.01}Na_{0.02}Li_2SiO_4$ upon excitation at 445 nm (75 mW) and 488 nm (150 mW) by Lasers (Example 4).

Figure 15:
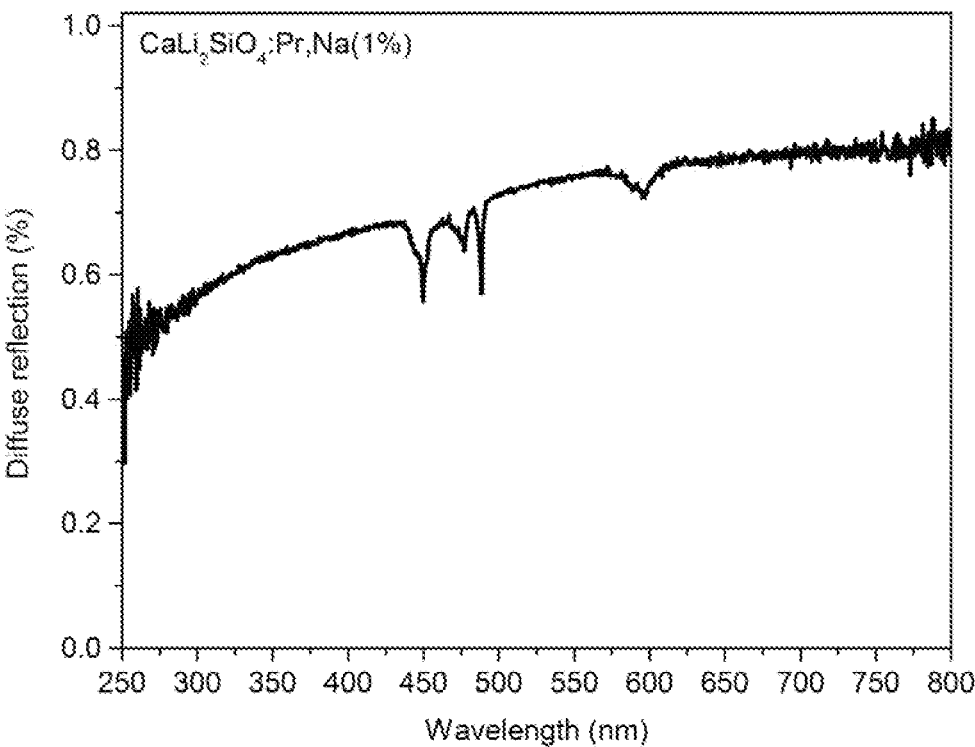
FIG. 15 shows a reflection spectrum of $Ca_{0.98}Pr_{0.98}Na_{0.01}Li_2SiO_4$ (Example 1).

FIG. 15: Reflection spectrum of $Ca_{0.98}Pr_{0.01}Na_{0.01}Li_2SiO_4$ (Example 1). $BaSO_4$ was used as reference.

Figure 16:
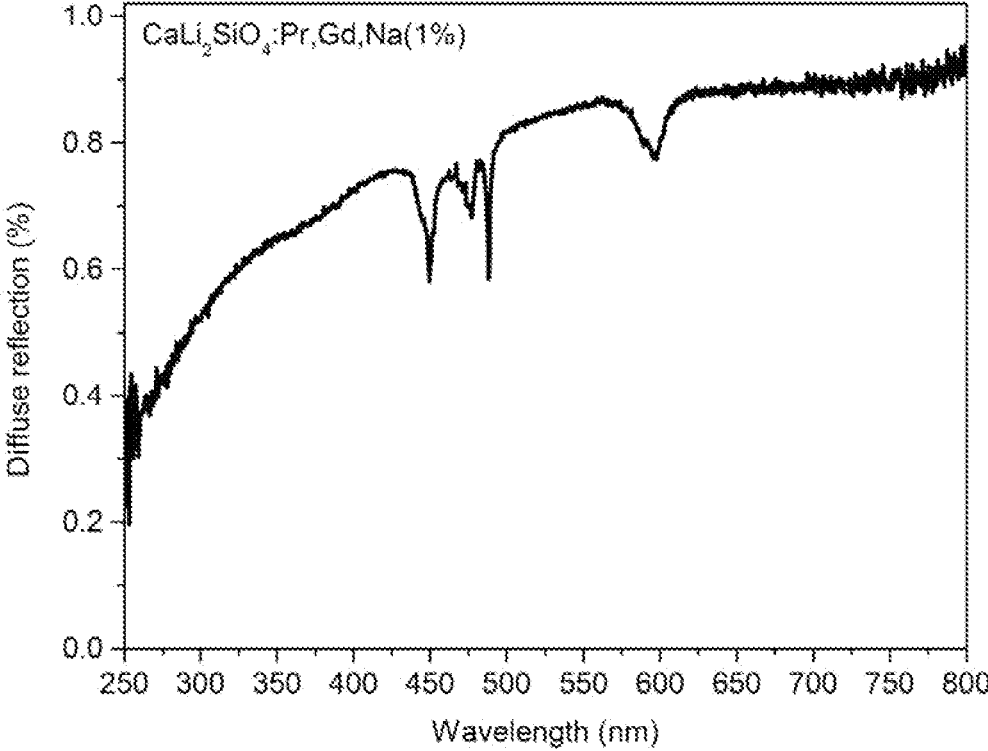
FIG. 16 shows a reflection spectrum of $Ca_{0.96}Pr_{0.01}Gd_{0.01}Na_{0.02}Li_2SiO_4$ (Example 2).

FIG. 16: Reflection spectrum of $Ca_{0.96}Pr_{0.01}Gd_{0.01}Na_{0.02}Li_2SiO_4$ (Example 2). $BaSO_4$ was used as reference.

Figure 17:
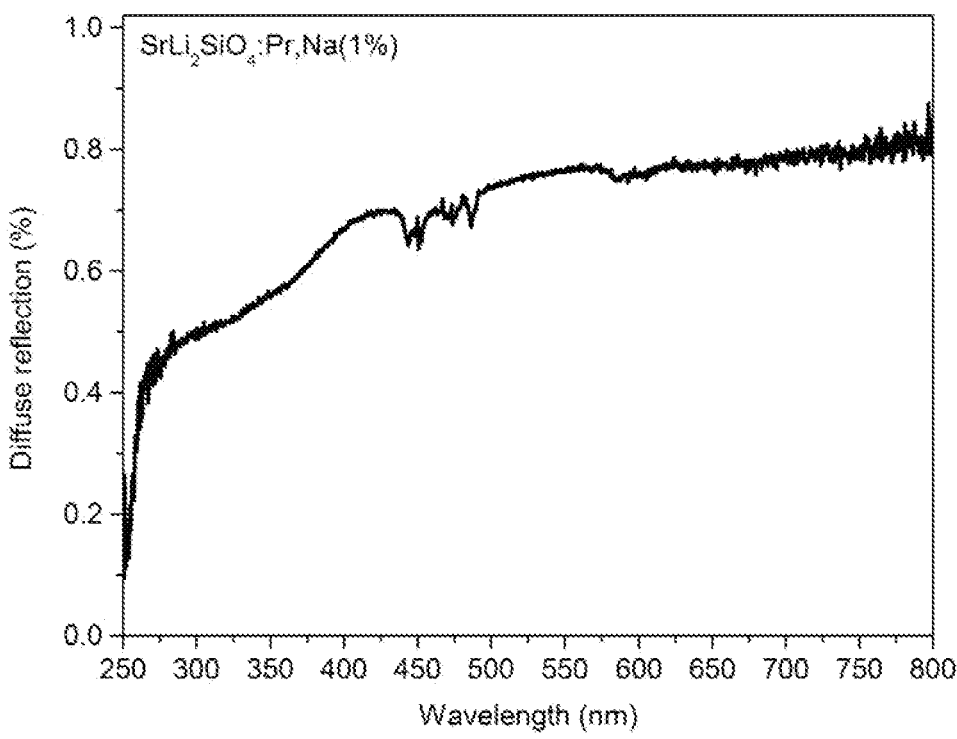
FIG. 17 shows a reflection spectrum of $Sr_{0.98}Pr_{0.01}Na_{0.01}Li_2SiO_4$ (Example 3).

FIG. 17: Reflection spectrum of $Sr_{0.98}Pr_{0.01}Na_{0.01}Li_2SiO_4$ (Example 3). $BaSO_4$ was used as reference.

Figure 18:
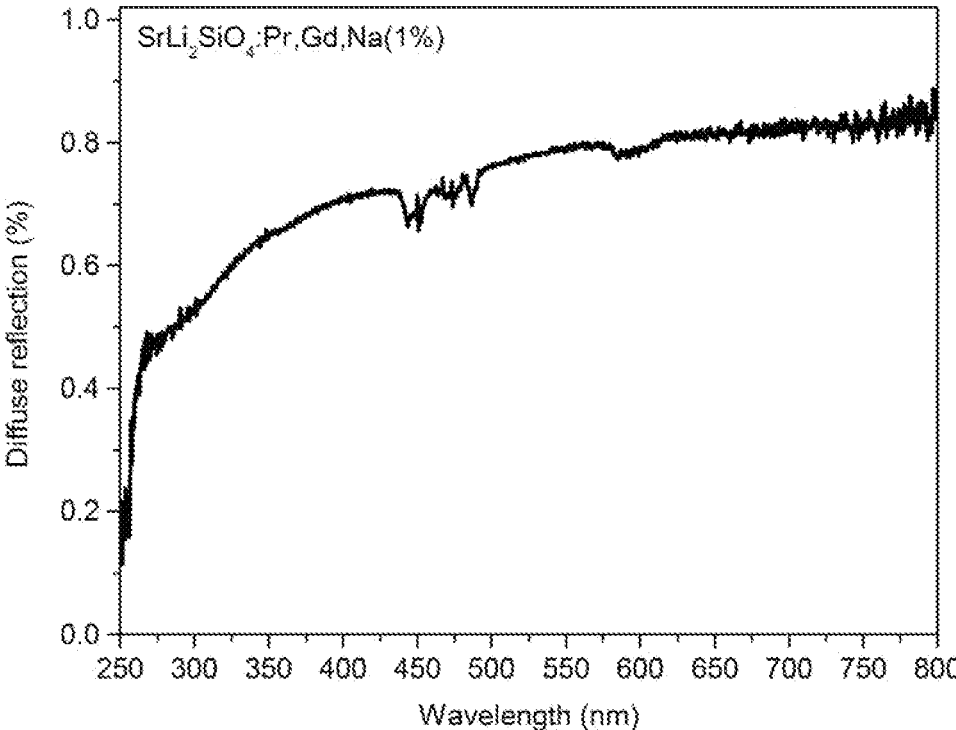
FIG. 18 shows a reflection spectrum of $Sr_{0.96}Pr_{0.01}Gd_{0.01}Na_{0.01}Li_2SiO_4$ (Example 4).

FIG. 18: Reflection spectrum of $Sr_{0.96}Pr_{0.01}Gd_{0.01}Na_{0.02}Li_2SiO_4$ (Example 4). $BaSO_4$ was used as reference.

Figure 19:
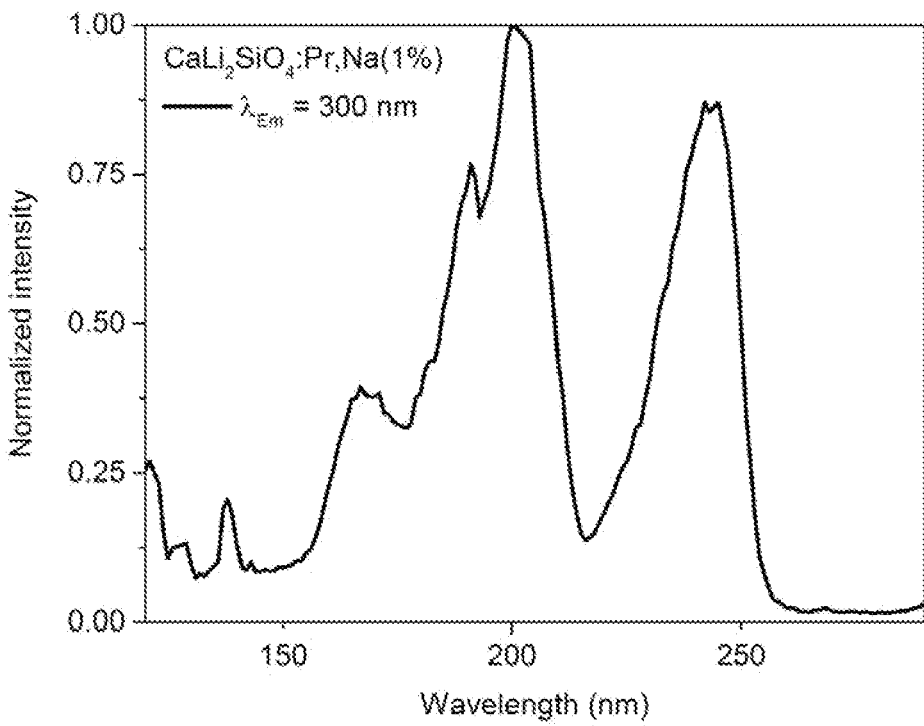
FIG. 19 shows an excitation spectrum of $Ca_{0.98}Pr_{0.01}Na_{0.01}Li_2SiO_4$ monitoring emission at 300 nm (Example 1).

FIG. 19: Excitation spectrum of $Ca_{0.98}Pr_{0.01}Na_{0.01}Li_2SiO_4$ monitoring emission at 300 nm (Example 1).

Figure 20:
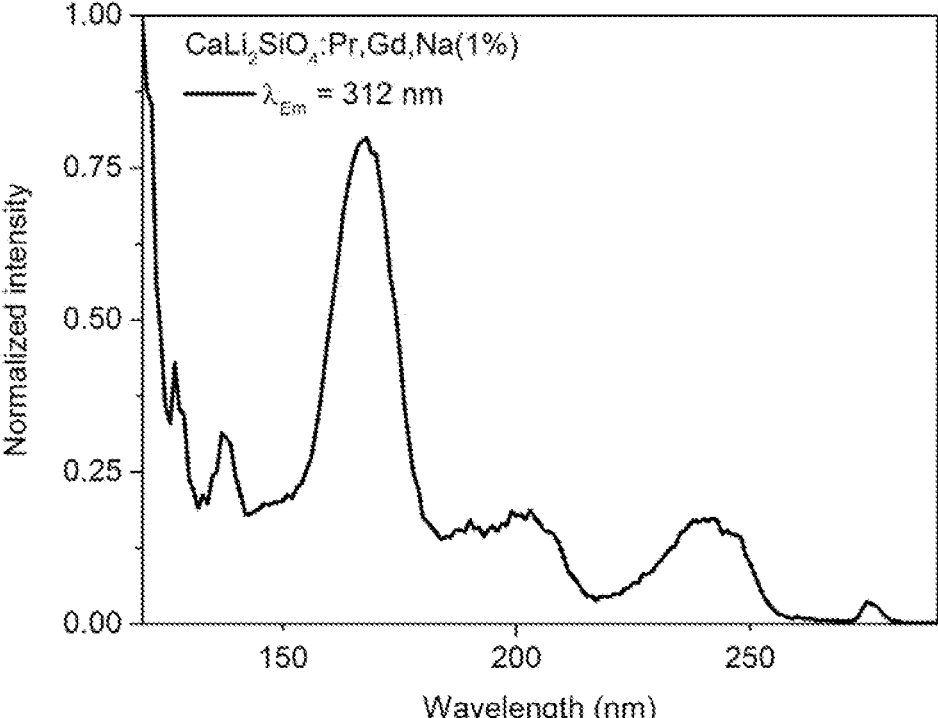
FIG. 20 shows an excitation spectrum of $Ca_{0.96}Pr_{0.01}Gd_{0.01}Na_{0.02}Li_2SiO_4$ monitoring emission at 312 nm (Example 2).

FIG. 20: Excitation spectrum of $Ca_{0.96}Pr_{0.01}Gd_{0.01}Na_{0.02}Li_2SiO_4$ monitoring emission at 312 nm (Example 2).

Figure 21:
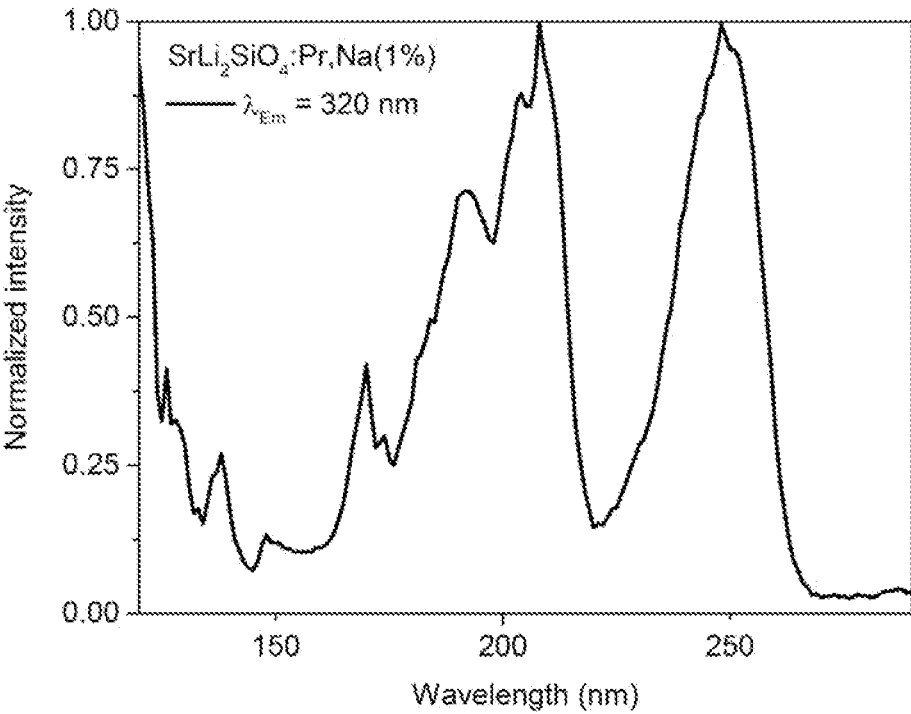
FIG. 21 shows an excitation spectrum of $Sr_{0.98}Pr_{0.01}Na_{0.01}Li_2SiO_4$ monitoring emission at 320 nm (Example 3).

FIG. 21: Excitation spectrum of $Sr_{0.98}Pr_{0.01}Na_{0.01}Li_2SiO_4$ monitoring emission at 320 nm (Example 3).

Figure 22:
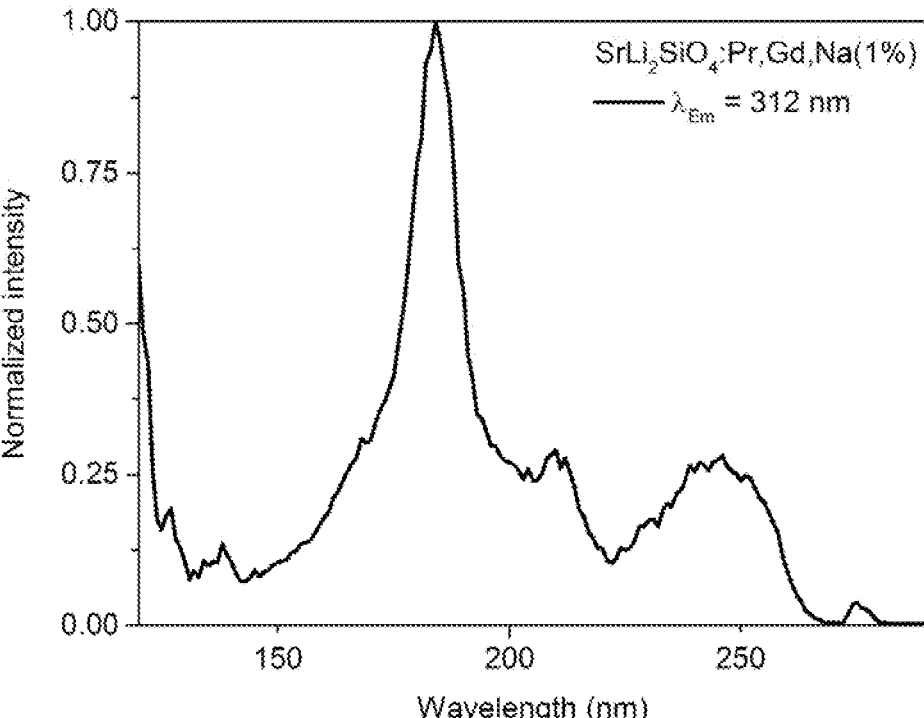
FIG. 22 shows an excitation spectrum of $Sr_{0.96}Pr_{0.01}Gd_{0.01}Na_{0.02}Li_2SiO_4$ monitoring emission at 312 nm (Example 4).

FIG. 22: Excitation spectrum of $Sr_{0.96}Pr_{0.01}Gd_{0.01}Na_{0.02}Li_2SiO_4$ monitoring emission at 312 nm (Example 4).

Figure 23A:
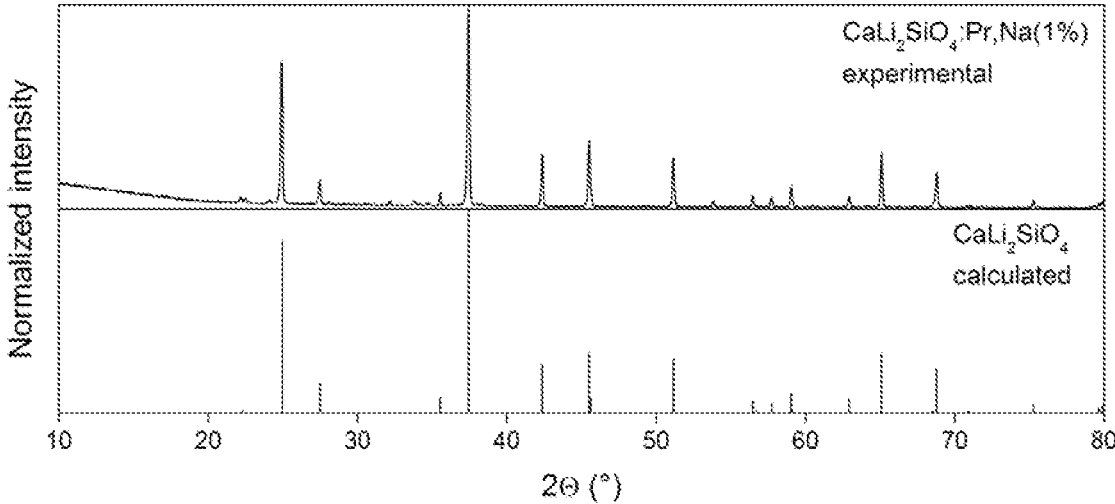
FIG. 23A shows an increase of crystallinity of $CaLi_2SiO_4$: $Pr^{3+}$ via high-energy milling (200 U/min, 4h) and reduction of additional phases as impurity.
Figure 23B:
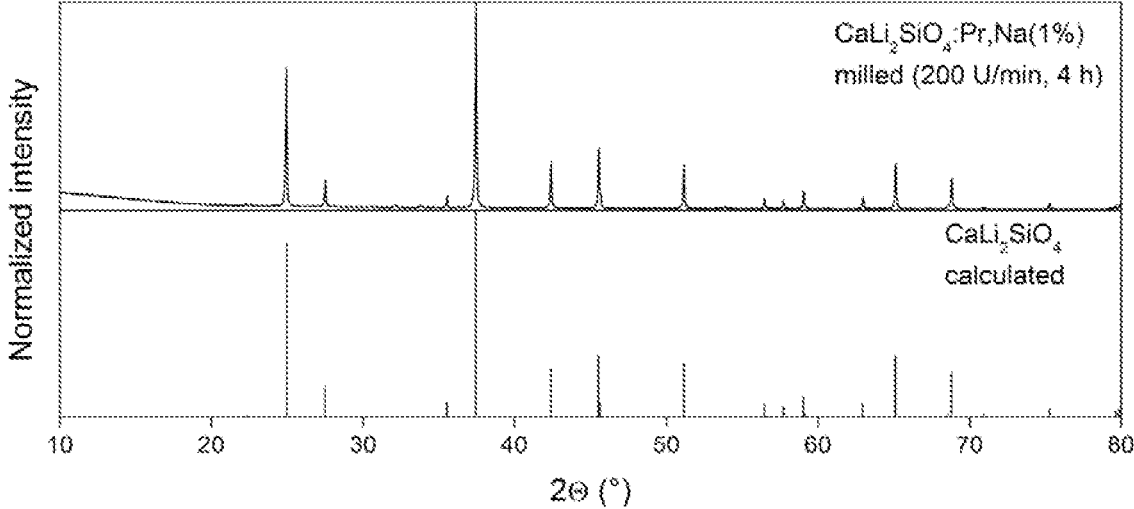
FIG. 23B shows an increase of crystallinity of $CaLi_2SiO_4$: $Pr^{3+}$ via high-energy milling (200 U/min, 4h) and reduction of additional phases as impurity.

FIGS. 23A and 23B : Increase of crystallinity of $CaLi_2SiO_4{:}Pr^{3+}$ via high-energy milling (200 U/min, 4 h) and reduction of additional phases as impurity.

Figure 24A:
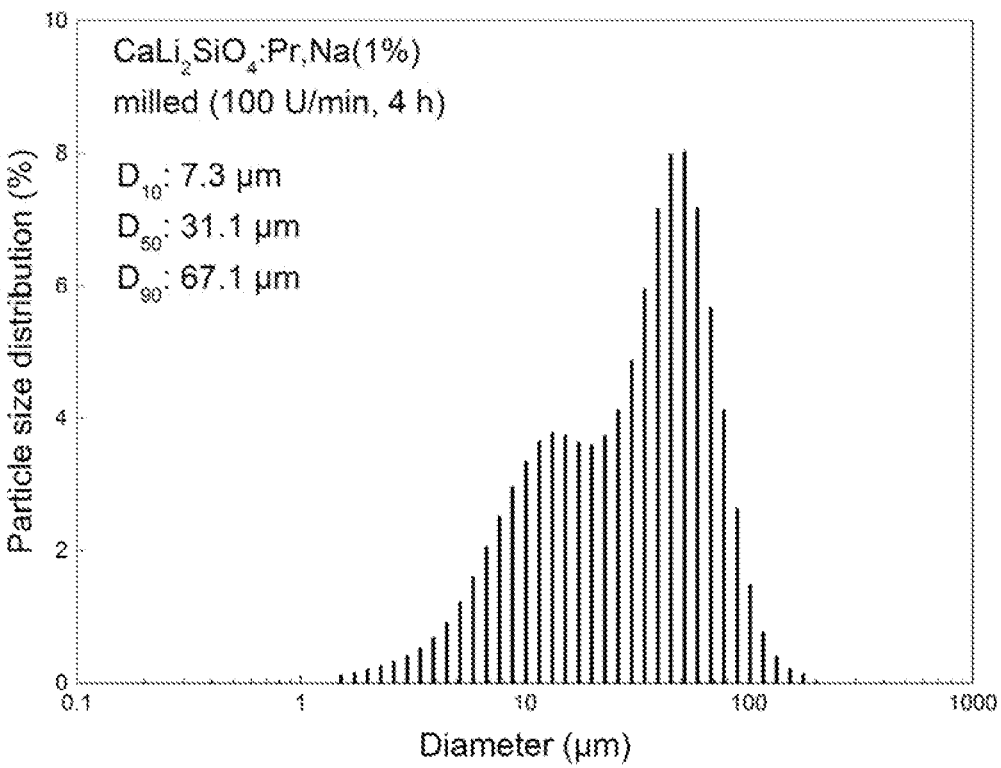
FIG. 24A shows a particle size distribution of $CaLi_2SiO_4$: $Pr^{3+}$ at 100 U/min, 4h.
Figure 24B:
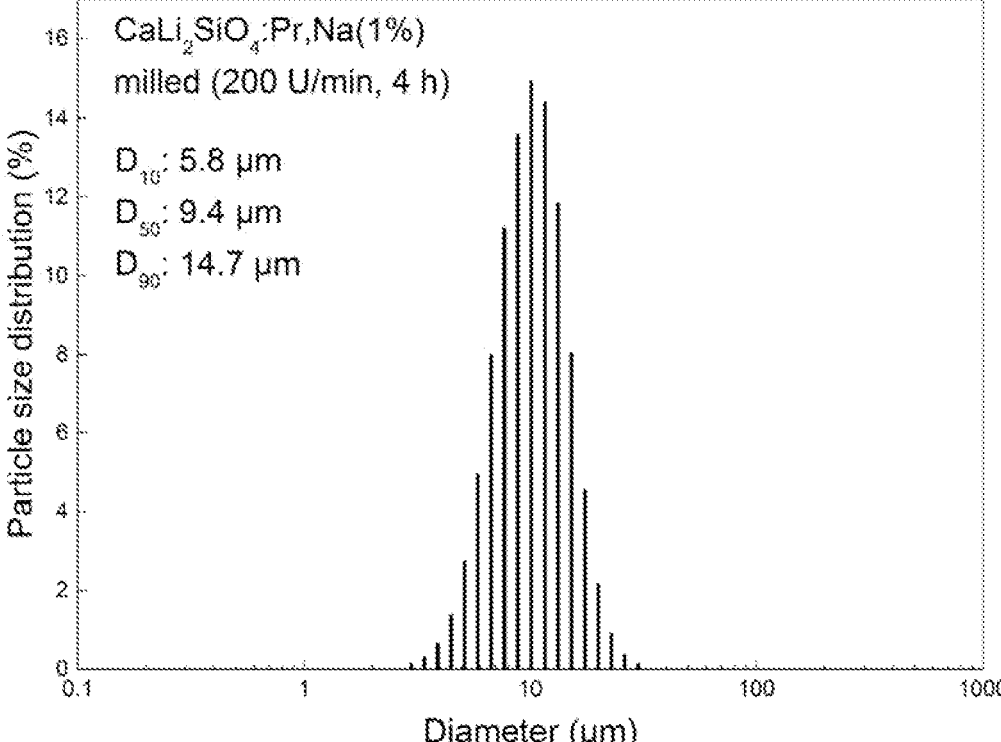
FIG. 24B shows a particle size distribution of $CaLi_2SiO_4$: $Pr^{3+}$ at 200 U/min, 4 h.
Figure 24C:
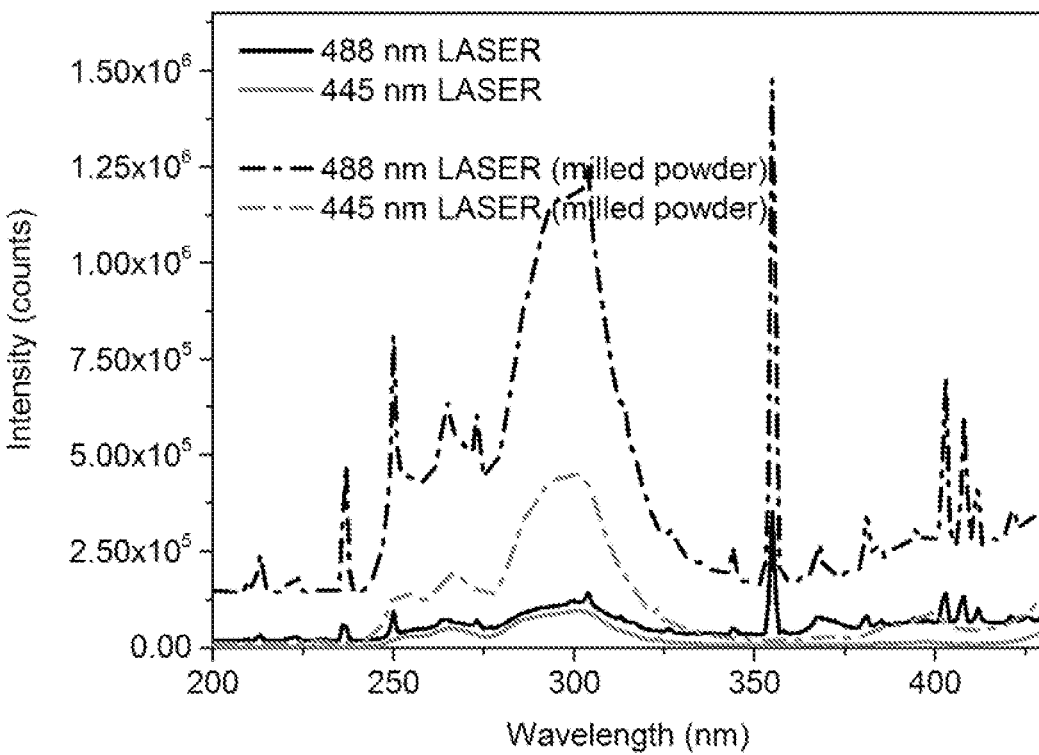
FIG. 24C shows an increased emission with increased purity of phase and increased crystallinity

FIGS. 24A, 24B, and 24C: Particle size distribution of $CaLi_2SiO_4{:}Pr^{3+}$ a) 100 U/min, 4 h b) 200 U/min, 4 h, c) increased emission with increased purity of phase and increased crystallinity.

Figure 25A:
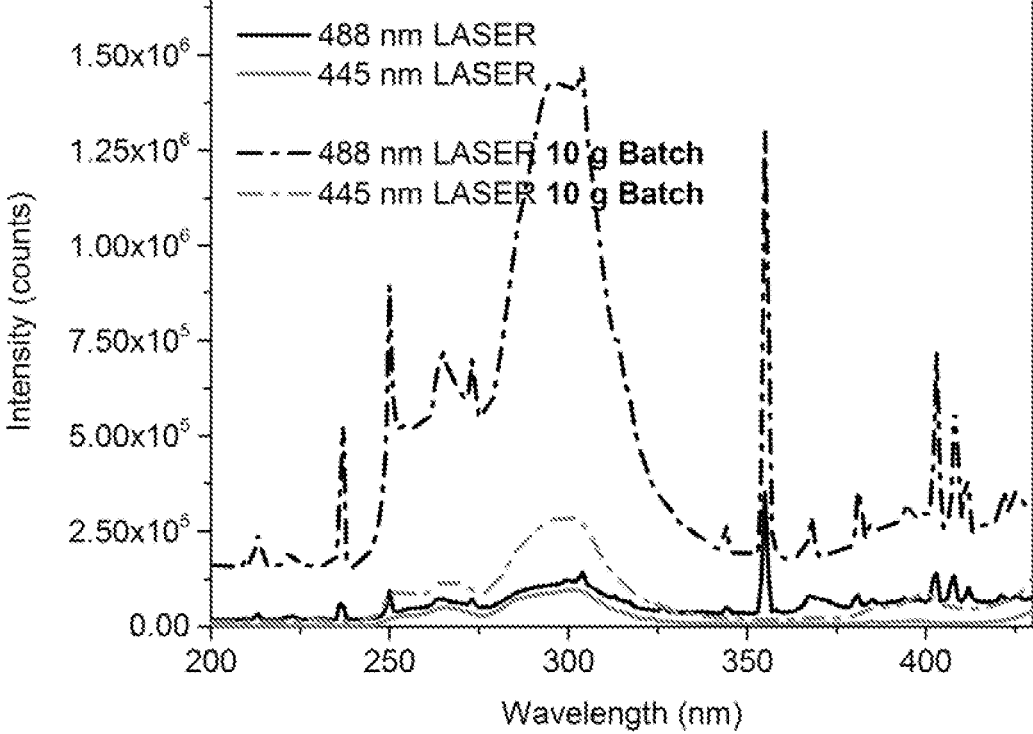
FIG. 25A shows an increased emission with increased purity of phase and increased crystallinity.
Figure 25B:
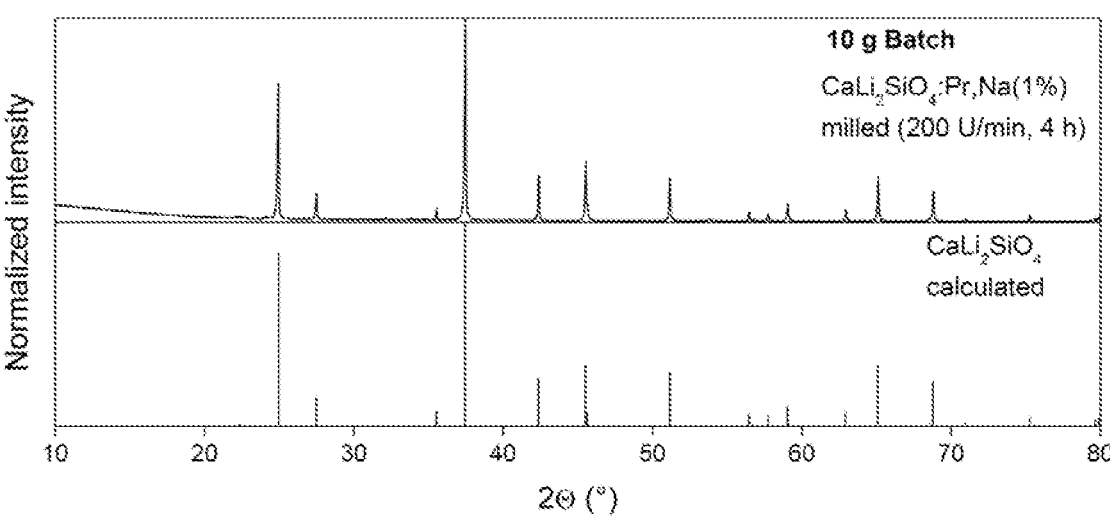
FIG. 25B shows a reduction of additional phases as impurities and increased crystallinity.
Figure 25C:
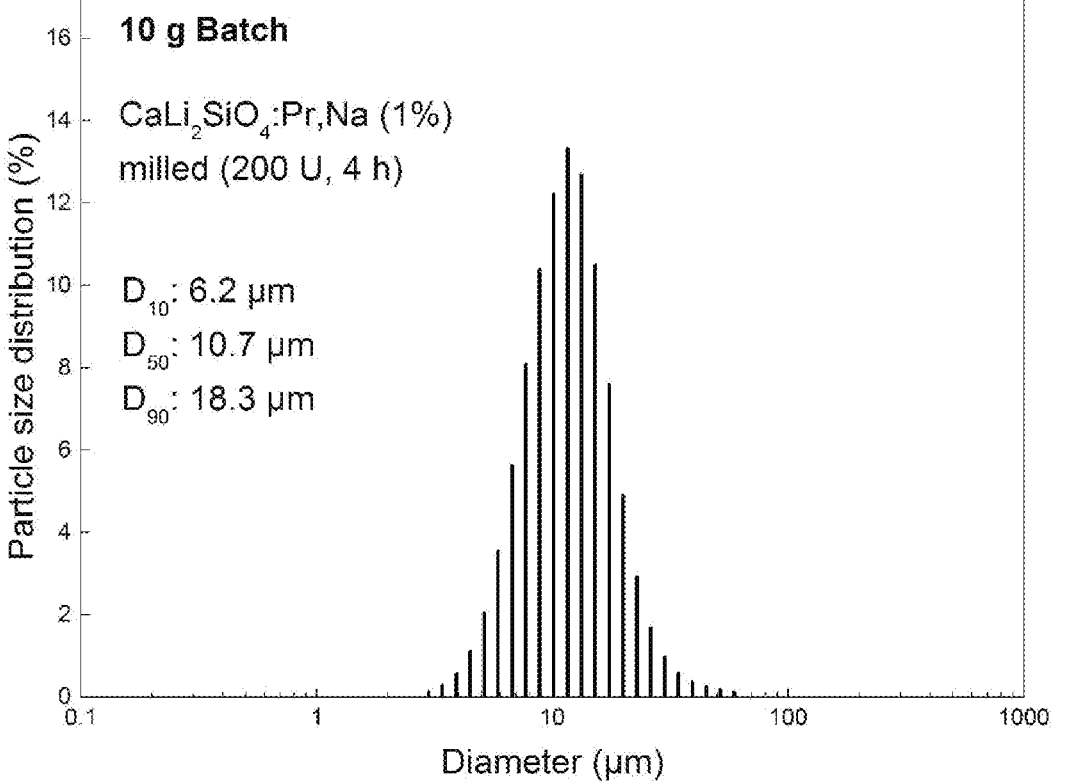
FIG. 25C shows a particle size distribution of $CaLi_2SiO_4$: $Pr^{3+}$ (200 U/min, 4 h).

FIGS. 25A, 25B, and 25C: a) increased emission with increased purity of phase and increased crystallinity, b) reduction of additional phases as impurities and increased crystallinity c) Particle size distribution of $CaLi_2SiO_4{:}Pr^{3+}$ (200 U/min, 4 h)

FIG. 26: Simplified energy level scheme of $Pr^{3+}$ (ground state configuration $[Xe]4f^2$) and $Gd^{3+}$ (ground state configuration $[Xe]4f^7$) showing the relevant optical transitions and energy transfer processes involved in the up-conversion mechanism resulting in UV emission.

FIGS. 27A and 27B: a) above: XRPD of educts before milling, below XRPD $CaLi_2SiO_4$ calculated, b) XRPD milled educts, below: XRPD $CaLi_2SiO_4$ calculated.

FIGS. 27C and 27D: c) above: silicate-based lanthanide ion doped material heating (calcination) of milled for 12 h at 850° C. in air, reflex $2\Theta{=}37.39°$ with 13357 counts, below: XRPD $CaLi_2SiO_4$ calculated, d) above: second heating 6 h, 850° C. forming gas ($H_2$ (5%)/$N_2$ (95%)), reflex $2\Theta{=}37.39°$ with 15423 counts, below: XRPD $CaLi_2SiO_4$ calculated.

Figure 27E:
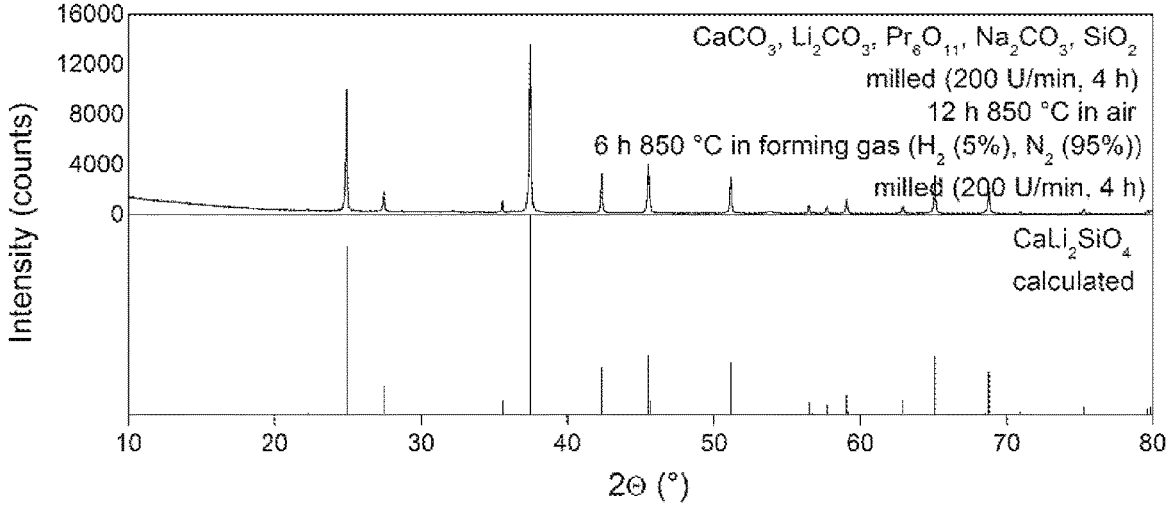
FIG. 27E shows a further grinding decrease the crystallinity: reflex $2\Theta =37.39°$ reduced to 13576 counts on top, and an XRPD of $CaLi_2SiO_4$ calculated below.

FIG. 27E: e) above: further grinding decrease the crystallinity: reflex $2\Theta{=}37.39°$ reduced to 13576 counts, below: below: XRPD $CaLi_2SiO_4$ calculated.

FIGS. 28A and 28B: a) above: silicate-based lanthanide ion doped material ($CaLi_2SiO_4{:}Pr^{3+}$, $Na^+$) heating (calcination) for 12 h at 850° C. in air and afterwards in a reducing atmosphere at elevated temperature ($H_2$/inertgas, 6 h 850° C., not milled): reflex $2\Theta{=}37.39°$ 10964 counts; below:

XRPD $CaLi_2SiO_4$ calculated, b) above: milled silicate-based lanthanide ion doped material after tempering in reducing atmosphere,: reflex $2\Theta{=}37.39°$ 18665 counts, (milling: 4 h 200 rpm, $CaLi_2SiO_4{:}Pr^{3+}$, $Na^+$), below: XRPD $CaLi_2SiO_4$ calculated

The invention claimed is:

1. A silicate-based material, comprising:

a crystalline silicate material doped with at least one lanthanide ion selected from the group consisting of praseodymium, gadolinium, and wherein the crystalline silicate material converts electromagnetic radiation energy of at least one longer wavelength in a range of 380-550 nm electromagnetic radiation energy of at least one shorter wavelength in a range of 220 to 425 nm, wherein the at least one longer wavelength has a longer wavelength than the at least one shorter wavelength;

wherein the crystalline silicate material is selected from the general formula I $$A_{1-x-y-z}B^*{}_yB_2SiO_4{:}Ln^1{}_x,Ln^2{}_z. \qquad\qquad I$$

wherein x=0.0001-0.05, z=0 or z=0.0001 to 0.3, and y=x+z, wherein A is selected from the group consisting of Mg, Ca, Sr and Ba, wherein B is selected from the group consisting of Li, Na, K, Rb and Cs, wherein B* is selected from the group consisting of Li, Na and K, wherein B equal to B* or B being not equal to B*, $Ln^1$ is praseodymium (Pr), and $Ln^2$ is gadolinium (Gd).

2. The silicate-based material according to claim 1, wherein the crystalline silicate material is not a hydrate of a silicate.

3. The silicate-based material according to claim 1, wherein a crystallinity of the silicate-based material is greater than 70%.

4. The silicate-based material according to claim 1, wherein the crystalline silicate material comprises:

a crystalline pure phase, or a silica-based material comprising at least one crystal phase that encompasses at least 90 weight-% of the silica-based material.

5. The silicate-based material according to claim 1, wherein the crystalline silicate material is a solid solution of a crystalline silicate or of crystalline silicate doped with lanthanide ions comprising at least one alkali ion and at least one earth alkali ion.

6. A process for the production of a silicate-based material, the process comprising:

combining the following components i), ii), and iii), i) and/or lanthanide oxide, wherein a lanthanide ion in the at least one lanthanide salt and/or lanthanide oxide is selected from the group consisting of praseodymium, gadolinium, erbium, and neodymium, ii) a silicate, and iii) at least one earth alkali salt and at least one alkali salt selected from the group consisting of a lithium salt, a lithium compound, a sodium salt, and a potassium salt, wherein the combining comprises:

a) blending i), ii), and iii) by milling, and obtaining a mixture, or b) blending i), ii), and iii) in an organic polar or non-polar solvent that is not a protic solvent, and obtaining a mixture, wherein the obtained mixture of b) is calcinated at 600° C. to 1000° C. to remove organic components, and to obtain a calcinated mixture, performing a calcination of the mixture of a) or the calcinated mixture of b) in a calcination at a temperature below a melting temperature of the silicate-based material, wherein at least partial crystallization occurs, and performing a further calcination under a reducing atmosphere, wherein the lanthanide ion is reduced to an $Ln^{3+}$ ion, and obtaining the silicate-based material, wherein the obtained silicate-based material is milled, and wherein the obtained silicate-based material is subjected to tribological impacts at 100 to 500 rotations/min for 1 to 6 hours, using corundum as milling material.

7. A composition, foil or film, comprising the silicate-based material according to claim 1 for self-disinfection purposes or for reduction of microorganisms.

8. A method, comprising:

adding the silicate-based material according to claim 1 into a coating composition or a material to provide a coating or surface that is able to inactivate microorganisms covering the coating or surface under exposure of electromagnetic radiation energy of a longer wavelength in a range of 500 nm and below.

9. The silicate-based material according to claim 1, wherein an emission maximum of the electromagnetic radiation energy of the shorter wavelengths has an intensity of at least $1 \cdot 10^3$ counts/(mm$^2$*s).

10. The silicate-based material according to claim 1, wherein in formula I, B and B* are not equal.

\* \* \* \* \*